(12) United States Patent  
Ray et al.

(10) Patent No.: US 12,192,311 B2  
(45) Date of Patent: Jan. 7, 2025

(54) ATTRIBUTE RESIDUAL CODING IN G-PCC

(71) Applicant: QUALCOMM Incorporated, San Diego, CA (US)

(72) Inventors: Bappaditya Ray, San Diego, CA (US); Geert Van der Auwera, Del Mar, CA (US); Adarsh Krishnan Ramasubramonian, Irvine, CA (US); Louis Joseph Kerofsky, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 17/342,249

(22) Filed: Jun. 8, 2021

(65) Prior Publication Data

US 2021/0385303 A1 Dec. 9, 2021

Related U.S. Application Data

(60) Provisional application No. 63/153,187, filed on Feb. 24, 2021, provisional application No. 63/036,878, filed on Jun. 9, 2020.

(51) Int. Cl.
| | |
|---|---|
| *G06T 9/00* | (2006.01) |
| *H04L 47/12* | (2022.01) |
| *H04L 65/70* | (2022.01) |
| *H04L 69/04* | (2022.01) |
| *H04N 19/186* | (2014.01) |
| *H04N 19/70* | (2014.01) |

(52) U.S. Cl.  
CPC ............. *H04L 69/04* (2013.01); *H04L 47/12* (2013.01); *H04L 65/70* (2022.05)

(58) Field of Classification Search  
None  
See application file for complete search history.

(56) References Cited

U.S. PATENT DOCUMENTS

| | | | |
|---|---|---|---|
| 2012/0207400 A1* | 8/2012 | Sasai | H04N 19/13 |
| | | | 382/233 |
| 2019/0197739 A1* | 6/2019 | Sinharoy | G06T 7/55 |
| 2020/0035195 A1* | 1/2020 | Maeng | G06F 3/1423 |
| 2020/0217937 A1* | 7/2020 | Mammou | G01S 17/42 |

(Continued)

OTHER PUBLICATIONS

Mao, Shiwen, "An Introduction to point cloud compression standards" (Year: 2023).*

(Continued)

*Primary Examiner* — Nicholas R Taylor  
*Assistant Examiner* — Ho T Shiu  
(74) *Attorney, Agent, or Firm* — QUALCOMM Incorporated; Espartaco Diaz Hidalgo

(57) ABSTRACT

An example method of encoding a point cloud includes determining that residual values for all components except one component of an attribute of a point in the point cloud are equal to zero; based on the determination that the residual values for all components except the one component of the attribute are equal to zero, determining a value for the one component that is equal to a magnitude of a residual value of the one component of the attribute minus an offset; encoding the value of the one component; and signaling the encoded value in a bitstream.

50 Claims, 10 Drawing Sheets

(56) References Cited

U.S. PATENT DOCUMENTS

| | | | |
|---|---|---|---|
| 2020/0219288 A1* | 7/2020 | Joshi | G06T 9/40 |
| 2020/0302655 A1* | 9/2020 | Oh | G06T 9/001 |
| 2021/0104090 A1* | 4/2021 | Hur | H04N 13/15 |
| 2021/0407143 A1* | 12/2021 | Van der Auwera | H04N 19/70 |

OTHER PUBLICATIONS

Imdad, Ulfat, "Three Dimensional Point Cloud Compression and Decompression Using Polynomials of Degree One" (Year: 2019).*

3DG: "G-PCC Codec Description v6", Coding of Moving Pictures and Audio, ISO/IEC JTC1/SC29/WG11, N19091, Jan. 2020, Brussels, BE, Mar. 27, 2020, 92 pages.

"G-PCC Future Enhancements", 130, MPEG Meeting, Apr. 20, 2020-Apr. 24, 2020, ALPBACH, (Motion Picture Expert Group or ISO/IEC JTC1/SC29/WG11), No. n19328, Jul. 21, 2020, XP030289574, 140 Pages.

Tulvan C., et al., "Use Cases for Point Cloud Compression (PCC)", 115th MPEG Meeting, May 30, 2016-Jun. 3, 2016, Geneva, CH (Motion Picture Expert Group or ISO/IEC JTC1/SC29/WG11), No. N16331, Jun. 5, 2016, XP030269821, 8 Pages.

Sugio, T., (Panasonic): "[G-PCC] Attribute Residual Coding in TMC13", 125th MPEG Meeting, Jan. 14, 2019-Jan. 18, 2019, Marrakech, MA (Motion Picture Expert Group or ISO/IEC JTC1/SC29/WG11), No. m46108, Jan. 9, 2019, XP030214607, 7 Pages.

International Search Report and Written Opinion—PCT/US2021/036559—ISA/EPO—Sep. 28, 2021, (13 pp).

ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.

"Liaison to JTC1/WG9", 114. MPEG Meeting, Feb. 22, 2016-Feb. 26, 2016, San Diego, (Motion Picture Expert Group or ISO/IEC JTC1/SC29/WG11), No. N16126, Mar. 2, 2016 (Mar. 2, 2016), XP030268986, Retrieved from the Internet: URL: http://phenix.int-evry.fr/mpeg/doc_end_user/documents/114_San%20Diego/wg11/W16126.zip">http://phenix.int-evry.fr/mpeg/doc_end_user/documents/114_San%20Diego/wg11/W16126.zip. w16151. Thoughts and Use Cases on Big Media.docx. [Retrieved on Mar. 2, 2016]. the whole document (11 pp).

Zhang (Tencent) X., et al., "Information technology—MPEG-I (Coded Representation of Immersive Media)—Part 9: Geometry-based point Cloud Compression", 130, MPEG Meeting, Apr. 20, 2020-Apr. 24, 2020, Alpbach, (Motion Picture Expert Group or ISO/IEC JTC1/SC29/WG11) No. M53421, Apr. 20, 2020, XP030286927 (137 pp).

* cited by examiner

ATTRIBUTE RESIDUAL CODING IN G-PCC

This application claims the benefit of U.S. Provisional Application No. 63/036,878, filed Jun. 9, 2020, and U.S. Provisional Application No. 63/153,187, filed Feb. 24, 2021, the entire contents of each of which are incorporated by reference herein.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for coding attribute residual, such as for the Geometry Point Cloud Compression (G-PCC) standard currently being developed. However, the example techniques are not limited to the G-PCC standard. In G-PCC, a point may include a plurality of attributes, and each attribute may include one or more components. An example of an attribute is a color attribute, and a color attribute may include three color components (e.g., RGB, YCbCr) used to define the color of the point. Color components are one example of attributes and other examples of attributes are possible, including examples of different components of an attribute (e.g., a surface normal attribute includes x, y, z components). For coding attributes of a point, a G-PCC encoder may determine residual values (e.g., residual coefficients), and the G-PCC encoder may signal information indicative of the residual values and a G-PCC decoder may receive information indicative of the residual values to reconstruct the point.

In some examples, the magnitude and sign information for residual values for each of the components (e.g., color component or other components) is encoded and decoded independently. It may be possible that a residual value for each of the components of a residual coefficient is zero, in which case there may be redundancy in such independent coding of magnitude and sign information. This disclosure describes example techniques for efficiently coding (e.g., encoding or decoding) component information such as when the residual values for the components are zero in G-PCC. In this way, the example techniques describe technical solutions to technical problems that provide for practical applications for attribute coding in G-PCC.

In one example, this disclosure describes a method of encoding a point cloud includes determining that residual values for all components except one component of an attribute of a point in the point cloud are equal to zero; based on the determination that the residual values for all components except the one component of the attribute are equal to zero, determining a value for the one component that is equal to a magnitude of a residual value of the one component of the attribute minus an offset; encoding the value of the one component; and signaling the encoded value in a bitstream.

In another example, this disclosure describes a method of decoding a point cloud includes decoding values for components of an attribute of a point in the point cloud, the values indicative of residual values for the components; determining that residual values for all components except one component of the attribute are equal to zero; based on the determination that the residual values for all components except the one component of the attribute are equal to zero, adding an offset to a decoded value for the one component of the attribute to determine a magnitude of a residual value for the one component; and reconstructing the components of the attribute of the point based on the residual values for the components.

In another example, this disclosure describes a device for encoding a point cloud that includes memory configured to store the point cloud; and processing circuitry configured to: determine that residual values for all components except one component of an attribute of a point in the point cloud are equal to zero; based on the determination that the residual values for all components except the one component of the attribute are equal to zero, determine a value for the one component that is equal to a magnitude of a residual value of the one component of the attribute minus an offset; encode the value of the one component; and signal the encoded value in a bitstream.

In another example, this disclosure describes a device for decoding a point cloud that includes memory configured to store the point cloud; and processing circuitry configured to: decode values for components of an attribute of a point in the point cloud, the values indicative of residual values for the components; determine that residual values for all components except one component of the attribute are equal to zero; based on the determination that the residual values for all components except the one component of the attribute are equal to zero, add an offset to a decoded value for the one component of the attribute to determine a magnitude of a residual value for the one component; and reconstruct the components of the attribute of the point based on the residual values for the components.

In another example, this disclosure describes a computer-readable storage medium storing instructions thereon that when executed cause one or more processors of a device for encoding a point cloud to: determine that residual values for all components except one component of an attribute of a point in the point cloud are equal to zero; based on the determination that the residual values for all components except the one component of the attribute are equal to zero, determine a value for the one component that is equal to a magnitude of a residual value of the one component of the attribute minus an offset; encode the value of the one component; and signal the encoded value in a bitstream.

In another example, this disclosure describes a computer-readable storage medium storing instructions thereon that when executed cause one or more processors of a device for decoding a point cloud to: decode values for components of an attribute of a point in the point cloud, the values indicative of residual values for the components; determine that residual values for all components except one component of the attribute are equal to zero; based on the determination that the residual values for all components except the one component of the attribute are equal to zero, add an offset to a decoded value for the one component of the attribute to determine a magnitude of a residual value for the one component; and reconstruct the components of the attribute of the point based on the residual values for the components.

The details of one or more examples are set forth in the accompanying drawings and the description below. Other features, objects, and advantages will be apparent from the description, drawings, and claims.

The details of one or more examples are set forth in the accompanying drawings and the description below. Other features, objects, and advantages will be apparent from the description, drawings, and claims.

DETAILED DESCRIPTION

Figure 1:
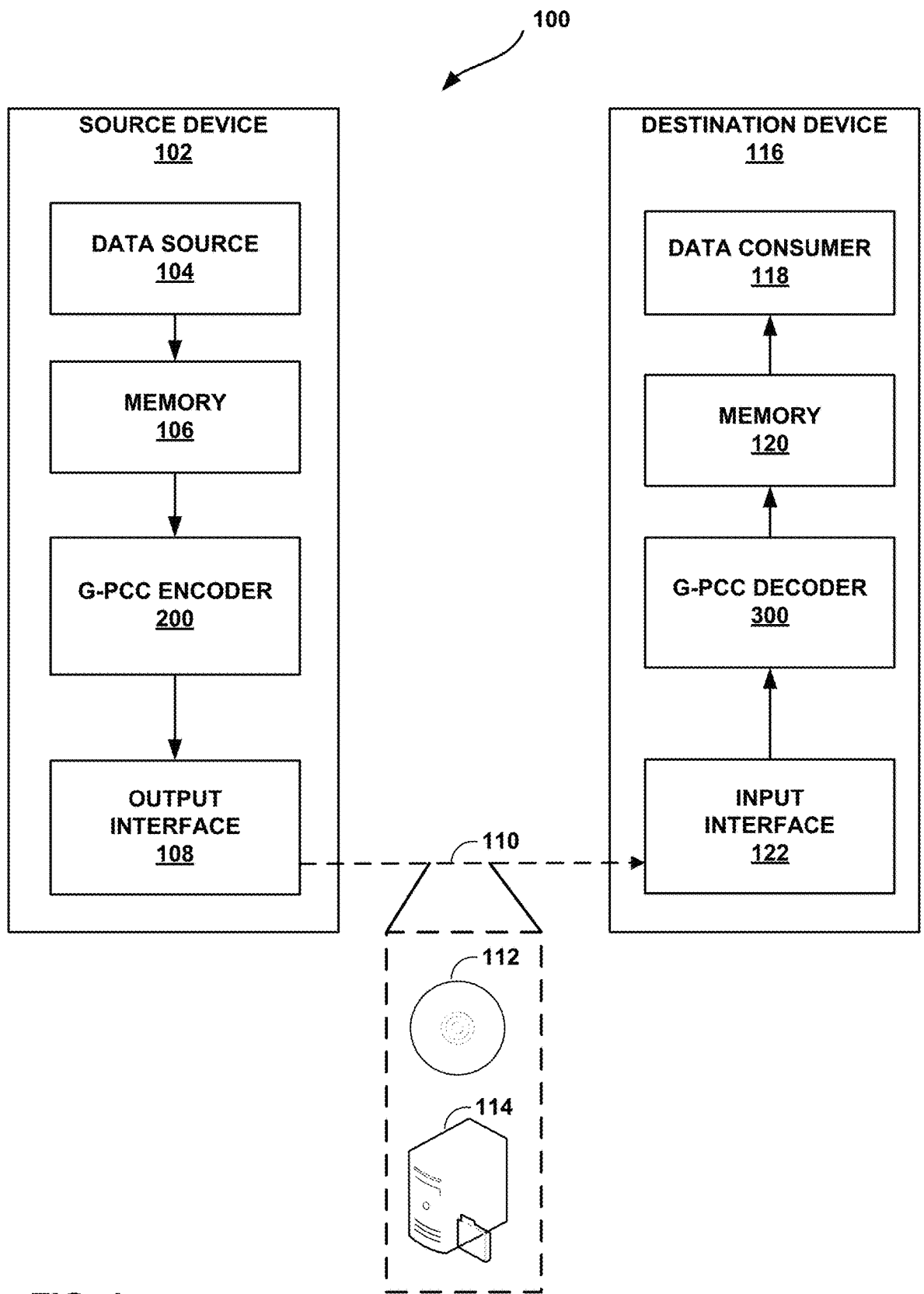
FIG. 1 is a block diagram illustrating an example encoding and decoding system that may perform the techniques of this disclosure.

This disclosure describes example techniques related to coding (e.g., encoding and decoding) of residual values for multicomponent attributes of points in a point cloud. Each point in a point cloud includes one or more attributes, such as color attributes, surface attributes, weather attributes, etc. Some of the attributes may be multicomponent attributes, and some other attributes may be single component attribute. For instance, a color attribute may include three components that indicate the color of the point (e.g., one luminance component and two chrominance components, or a red-component, green-component, and blue-component). A reflectance attribute may include a single component (e.g., one value that indicates the reflectance of the point).

To reduce the amount of data that a Geometry Point Cloud Compression (G-PCC) encoder needs to signal and that a G-PCC decoder needs to receive, rather than signaling the values of the components of the attributes of each point, the G-PCC encoder may be configured to determine residual values between attributes of a current point and a previously encoded point. The G-PCC encoder may signal the residual values, which tend to require fewer numbers of bits as compared to signaling the values of the components (e.g., magnitude of the residual values and sign information, such as positive or negative). The G-PCC decoder may receive the residual values, and add the residual values to the previously decoded point to reconstruct the current point.

For instance, the G-PCC encoder may determine a difference between a reflectance value of a reflectance attribute of a current point and a reflectance value of a reflectance attribute of a previous point to determine a residual reflectance value. The G-PCC encoder may signal the resulting residual reflectance value and information identifying the previous point. The G-PCC decoder may receive the residual reflectance value and identify the previous point. The G-PCC decoder may add the residual reflectance value to the reflectance value of the previous point to reconstruct the reflectance value of the current point.

In some instances, the residual values for components of an attribute can be zero. For instance, there may be a string of reflectance attributes for points in a consecutive order for which the residual values are zero. In this case, rather than encoding and signaling each zero residual value, the G-PCC encoder may signal and the G-PCC decoder may receive a syntax element (e.g., "zerorun" syntax element) that indicates a number of points in the order for which the residual values are zero.

However, for multicomponent attributes, there may be a situation where the residual values for some of the components are zero, but the residual value for another component is non-zero. For example, for the color attribute, the color components may be a luma component and two chroma components. As one example, the residual values for the chroma components may be zero, but the residual value for the luma component may be non-zero. In this case, the zerorun syntax element would indicate that there is no zerorun (i.e., there is a non-zero residual value for at least one component of the attribute).

This disclosure describes example techniques to reduce the amount of data that the G-PCC encoder signals and that the G-PCC decoder receives such as in cases where residual values for all components except one component of an attribute of a point in the point cloud is equal to zero (i.e., there is one component with a non-zero residual value, and all other components have a zero residual value). For instance, based on a determination that the residual values for all components except the one component of the attribute is equal to zero, the G-PCC encoder may determine a value for the one component that is equal to a magnitude of a residual value of the one component of the attribute minus an offset (e.g., a positive integer). The magnitude of the residual value may be the absolute value of the residual value. Rather than signaling the full value of the magnitude of the residual value, the G-PCC encoder may signal the determined value (e.g., magnitude of residual value minus offset), which may require fewer bits to signal than the bits needed to signal the full magnitude of the residual value. The G-PCC encoder may also signal sign information (e.g., whether the residual value is positive or negative) in addition to the magnitude of the residual value.

The G-PCC decoder may decode values for components of an attribute of a point in the point cloud, where the values are indicative of residual values for the components. The G-PCC decoder may determine that residual values for all components except one component of the attribute is equal to zero. Based on the determination that the residual values for all components except the one component of the attribute is equal to zero, the G-PCC decoder may add an offset to a value for the one component of the attribute to determine a magnitude of a residual value for the one component. In this way, the amount of data that the G-PCC decoder needs to receive may be reduced because the number of bits needed for the magnitude of the residual value minus offset may be fewer than the bits needed for the residual value. The G-PCC decoder may also decode information indicative of the sign of the residual value (e.g., positive or negative), and based on the magnitude of the residual value, and the sign of the residual value, the G-PCC decoder may determine the residual value.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to coding residual values for attributes of points in a point cloud. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to coding residual values for attributes of points in a point cloud. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames" of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19328, Alpbach, Austria, June 2020, and a description of the codec is available in G-PCC Codec Description v6, ISO/IEC JTC1/SC29/WG11 w19091, Brussels, Belgium, January 2020.

A point cloud contains a set of points in a 3D space, and may have attributes associated with the point. The attributes may be color information such as R, G, B or Y, Cb, Cr, or reflectance information, or other attributes. For ease, various examples are described with respect to the color attribute having color components (e.g., RGB or YCbCr), but the example techniques are applicable to attributes or components of attributes in general. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), the automotive industry (LIDAR sensors used to help in navigation), and in other applications that may employ mobile phones, tablet computers or other computing devices.

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

As described in more detail, G-PCC encoder 200 and G-PCC decoder 300 may be configured to determine that residual values for one or more components of a point, in the point cloud, are equal to 0. G-PCC encoder 200 and G-PCC decoder 300 may be configured to code the residual values, in a non-independent manner, based on the determination that the residual values for one or more of the components of the point is equal to 0. For example, coding the residual values, in the non-independent manner, may include coding a residual value (e.g., magnitude of the residual value) for one of the components in a first manner based on residual values for two other components being equal 0. The first manner may be different than a second manner in which to code a residual value for the one of the components based on residual values for the two other components not being equal to 0.

For example, a current point may include a plurality of attributes, and each attribute may include one or more components each with a component value. Rather than signaling the component value for each of the components of an attribute, G-PCC encoder 200 may determine residual values (e.g., difference) between component values of components of the current point and a previous point (e.g., a previously encoded point). G-PCC encoder 200 may be configured to signal the residual values and information used to identify the previous point.

G-PCC decoder 300 may receive the residual values and the information used to identify the previous point, which from the perspective of G-PCC decoder 300 is a previously decoded point. G-PCC decoder 300 may identify the previous point from the signaled information and add the residual values to the component values of the previous point to reconstruct the attributes of the current point.

Figure 4:
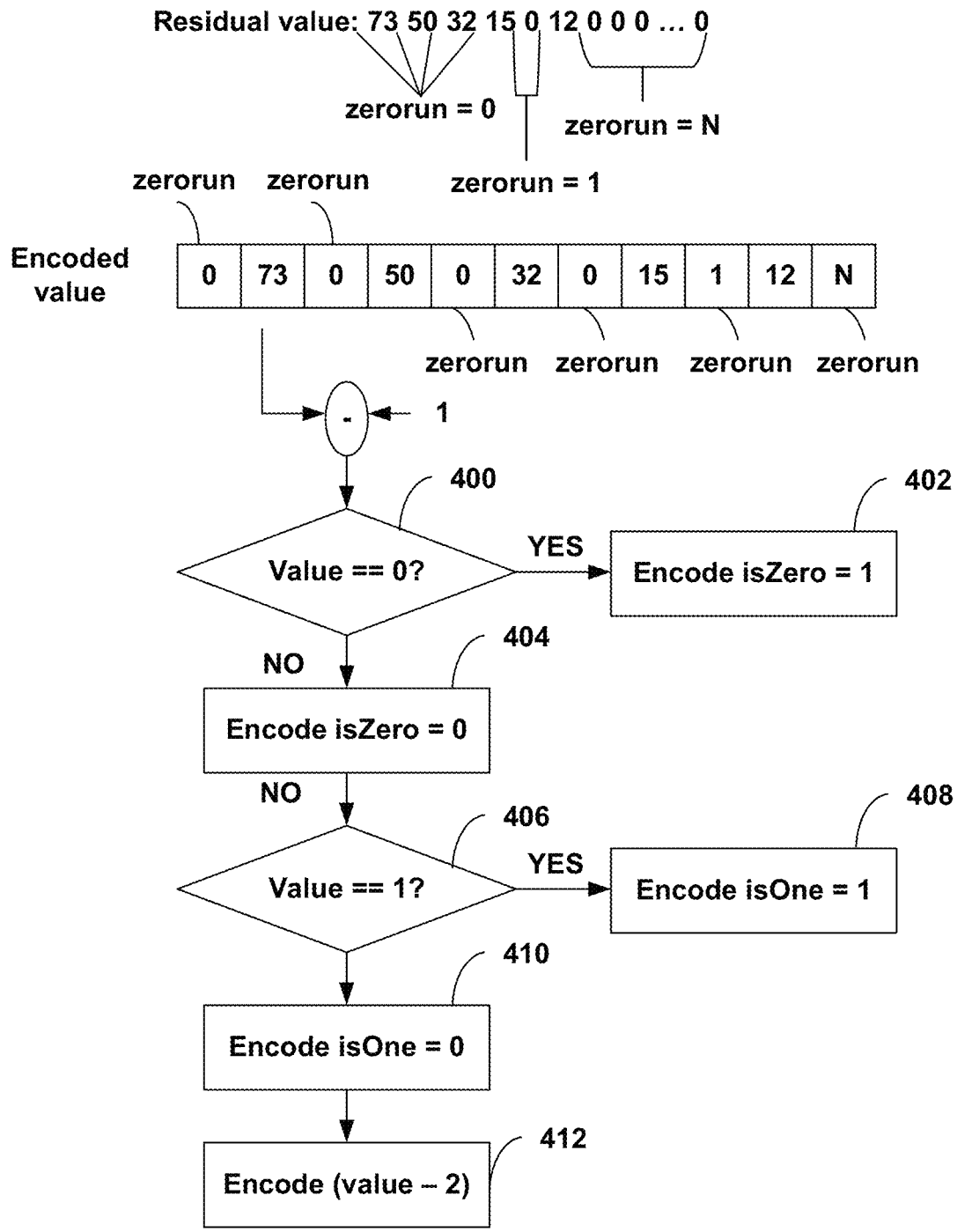
FIG. 4 is a flowchart illustrating an example of encoding residual values for G-PCC.

As described in more detail, such as with respect to FIG. 4, in some examples, the residual values for components of an attribute can be zero, and there may be a plurality of points in an order (e.g., consecutive points as defined by a scan order) for which the residual values for components of respective attributes is zero. In such cases, G-PCC encoder 200 may signal a zerorun syntax element that indicates the number of consecutive points that have residual values of zero for an attribute, rather than signaling the value of zero. G-PCC encoder 200 may then signal the residual value of the attribute of the point following the last point in the consecutive points that have residual values of zero. If the zerorun syntax element is equal to zero, that means that the residual value of the attribute of the current point is not equal to zero.

The residual value for an attribute may be considered as zero if the residual values for all components of the attribute are equal to zero. If the residual value for any component of the components of the attribute is not equal to zero, then the residual value for the attribute may be considered as non-zero. That is, for a multicomponent attribute, the residual value for the attribute may be considered to be zero, and counted in the zerorun syntax element if the residual values for all components is equal to zero. The zerorun syntax element for a multicomponent attribute may be equal to zero if the residual value for any component is not equal to zero.

In some techniques, G-PCC encoder 200 may encode the residual value for each component of an attribute if the residual value for any component is not equal to zero. The magnitude and sign information of the non-zero component is coded separately. This disclosure describes example techniques to reduce the amount of signaling, and thereby promote bandwidth utilization in some example cases where the residual value for at least one component of a multi-component attribute is not equal to zero.

For instance, although the residual value for one component of an attribute (e.g., multicomponent attribute) is not equal to zero, there is a possibility that the residual values for the other components are equal to zero. In the case where the residual values for the other components are equal to zero, there may be a reduction in the amount of data that needs to be signaled if G-PCC encoder 200 determines a value for the magnitude of one component that is equal to the magnitude of residual value of the one component minus an offset (e.g., a positive integer value like 1), while the signaling of sign information may remain unchanged. From the perspective of G-PCC decoder 300, if G-PCC decoder 300 determines that the values for all components except one component are equal to zero, then G-PCC decoder 300 may determine that the magnitude of the residual value for the one component by adding the decoded value for the one component plus the offset.

As an example, for a surface normal attribute of a current point, there may be three components: x-component, y-component, and z-component. G-PCC encoder 200 may determine a residual value for the x-component (e.g., x-component of the attribute of current point minus x-component of attribute of previous point), determine a residual value for the y-component (e.g., y-component of the attribute of current point minus y-component of attribute of previous point), and determine a residual value for the z-component (e.g., z-component of the attribute of current point minus z-component of attribute of previous point). In this example, the residual value for the x-component may be equal to zero, the residual value for the y-component may be equal to zero, and the residual value for the z-component may be equal to five (e.g., the magnitude of the residual value is five, and the sign information is positive).

G-PCC encoder 200 may be configured to determine that residual values for all components except one component of an attribute of a point in the point cloud is equal to zero. For example, the residual values for the x- and y-components are equal to zero, but not for the z-component. Based on the determination that the residual values for all components except the one component of the attribute are equal to zero, G-PCC encoder 200 may determine a value for the one component (e.g., a value for the magnitude of the z-component) that is equal to the magnitude of the residual value of the one component (e.g., five) minus an offset. As one example, the offset is equal to one, and in this example, the value for the one component (e.g., a value for the magnitude of the z-component) is equal to four (e.g., five minus one).

G-PCC encoder 200 may encode the value of zero for the component except the one component of the attribute (e.g., encode the value of zero for the x- and y-components), and signal the encoded value of zero. For the one component (e.g., z-component), G-PCC encoder 200 may encode the value of the one component (e.g., four), and signal the encoded value in the bitstream. In one or more examples, the value of the one component may refer to the magnitude of the one component. The sign information may be separately encoded and decoded. In general, fewer bits may be needed to signal smaller values, and therefore, fewer bits may be needed to signal the value of four instead of five. For example, G-PCC encoder 200 may encode and signal the values of 0, 0, and 4 for the magnitude information.

G-PCC decoder 300 may decode values for components of an attribute of a point in the point cloud, where the values are indicative of residual values for the components. For instance, keeping with the above example, G-PCC decoder 300 may decode the values of 0, 0, and 4. G-PCC decoder 300 may determine that residual values for all components except one component of the attribute are equal to zero. For instance, G-PCC decoder 300 may determine the residual value for the x-component is zero, and the residual value for the y-component is zero. However, the value that was received for the z-component is equal to four. Therefore, the residual value for the z-component is not equal to zero.

In this example, based on the determination that the residual values for all components except the one component of the attribute are equal to zero, G-PCC decoder 300 may add an offset to the decoded value for the one component of the attribute to determine the magnitude of the residual value for the one component. For instance, the offset value may be one, and G-PCC decoder 300 may add one to the decoded value for the z-component (e.g., four) to determine that the magnitude of the residual value for the z-component is five. G-PCC decoder 300 may reconstruct the components for the attribute of the point based on the residual values for the components. For instance, G-PCC decoder 300 may add the residual values for the components to the component values of the attribute of the previous point to reconstruct the components of the attribute of the point.

In the above example, G-PCC encoder 200 may be configured to signal the residual value for the x-component, followed by the y-component, and then the z-component. If the residual values for the x-component and the y-component are zero (e.g., the first two residual values for the attribute are zero), then the residual value for the z-component may need to be a non-zero value. Otherwise, the zerorun syntax element may indicate that residual values for all components is zero. Therefore, when G-PCC decoder 300 decodes the first two residual values as zero, then G-PCC decoder 300 may determine that the residual value for the next component (e.g., z-component) needs to be a non-zero value, since the zerorun syntax element did not indicate the residual value for the attribute is equal to zero. Because the residual value for the next component may need to be non-zero, G-PCC decoder 300 may be configured to add the offset to the value for the next component that G-PCC decoder 300 decodes (e.g., add one to the value that G-PCC decoder 300 decodes to determine the magnitude of the actual residual value for the component).

Accordingly, if an attribute has N components: component 0 to component (N−1), then if the value of component 0 to component N−2 is equal to 0, the value for component (N−1) that G-PCC encoder 200 signals and that G-PCC decoder 300 receives may be the value of component (N−1) minus the offset. For instance, for an N dimensional attribute (e.g., attribute with N components), if for the first (N−1) components (e.g., components 0 to N−2), the residual values are all zero (e.g., value(component 0)=value(component 1)= . . . =value(component (N−2))=0) for the N-th component (e.g., component (N−1)), for the magnitude part abs(value(component (N−1)−1) is coded instead of abs (value(component (N−1)).

G-PCC encoder 200 may signal and G-PCC decoder 300 may receive the residual values of the components in the order in which the residual values are processed. For instance, for an attribute there may be primary component and secondary components, where the primary component is processed before the secondary component because information of the primary component may be used to encode or decode the second components.

In some examples, G-PCC encoder 200 may signal and G-PCC decoder 300 may receive the residual values for the primary component first followed by the residual values for the secondary components. However, there may be instances where there is a higher likelihood that the residual values for the second components are zero as compared to the likelihood that the residual value of the primary component is zero.

As one example, the color attribute includes a luma component and two chroma components. The luma component may be the primary component and the two chroma components may be the secondary components. The processing order for G-PCC encoder 200 and G-PCC decoder 300 may be to process the luma component first followed by the chroma components. However, there may be higher likelihood that the chroma components have a residual value of zero.

Assume that the residual values for the chroma components are zero, and the residual value for the luma component is non-zero. If G-PCC encoder 200 were to signal the residual value for the luma components first followed by the chroma components, then G-PCC decoder 300 may not be able to determine that the residual values for all components except one component (e.g., both chroma components and not the luma component) is equal to zero until after decoding all residual component values.

In one or more examples, G-PCC encoder 200 may be configured to signal and G-PCC decoder 300 may be configured to receive the residual values for the components of an attribute in a coding order that is different than the processing order. For instance, G-PCC encoder 200 may signal and G-PCC decoder 300 may receive the residual values for the chroma components of the attribute before the residual value for the luma component. For instance, in the encoding order, G-PCC encoder 200 may encode and signal the residual values for luma component after the residual values for the chroma components. In the decoding order, G-PCC decoder 300 may receive and decode (e.g., parse) the residual values for luma component after the residual values for the chroma components. As described above, if the residual values for the chroma components is zero, then the value that G-PCC encoder 200 signals and the value that G-PCC decoder 300 decodes for the magnitude of the luma component may be the magnitude of the residual value for the luma component minus an offset (e.g., a value of one).

The above example of signaling and decoding a value that is the magnitude of the residual value of a component minus the offset may be for the case where the residual values for all components of an attribute are equal to zero except for one component. However, if G-PCC encoder 200 or G-PCC decoder 300 determines that residual values for at least two components of components of an attribute of a point in the point cloud are not equal to zero, then G-PCC encoder 200 may encode and G-PCC decoder 300 may decode the residual values for the components for the attribute (e.g., the encoded and decoded values may be the actual residual values for the components).

Also, the above examples for attributes include the surface normal attribute and the color attribute. There may be other examples of attributes, and the example techniques are not limited to the above examples. Examples of the attributes include color, frame number, humidity, temperature, weather (e.g., a combination of humidity and temperature), surface normal, or a combination of color and surface normal, as a few non-limiting examples.

Figure 2:
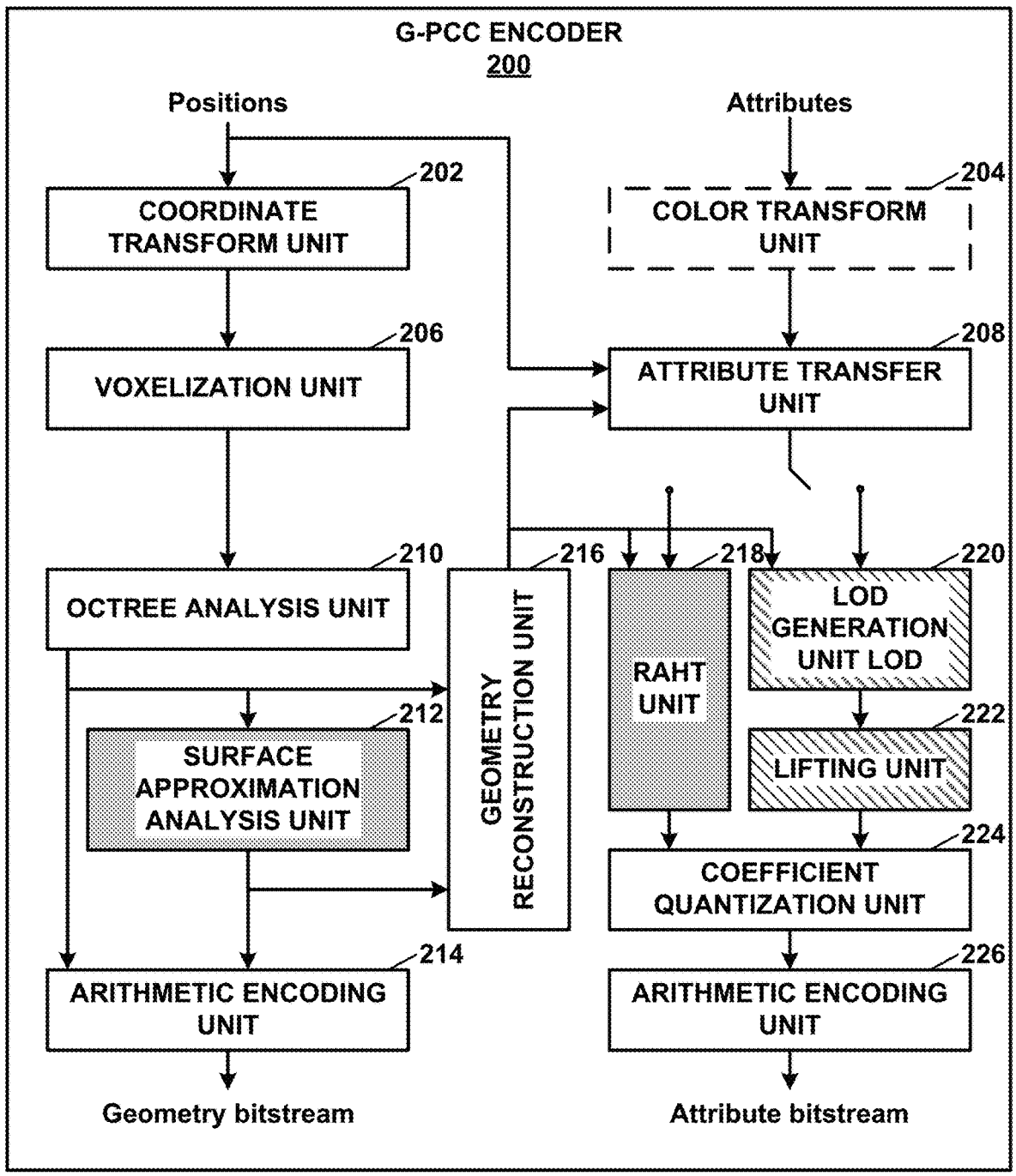
FIG. 2 is a block diagram illustrating an example Geometry Point Cloud Compression (G-PCC) encoder.
Figure 3:
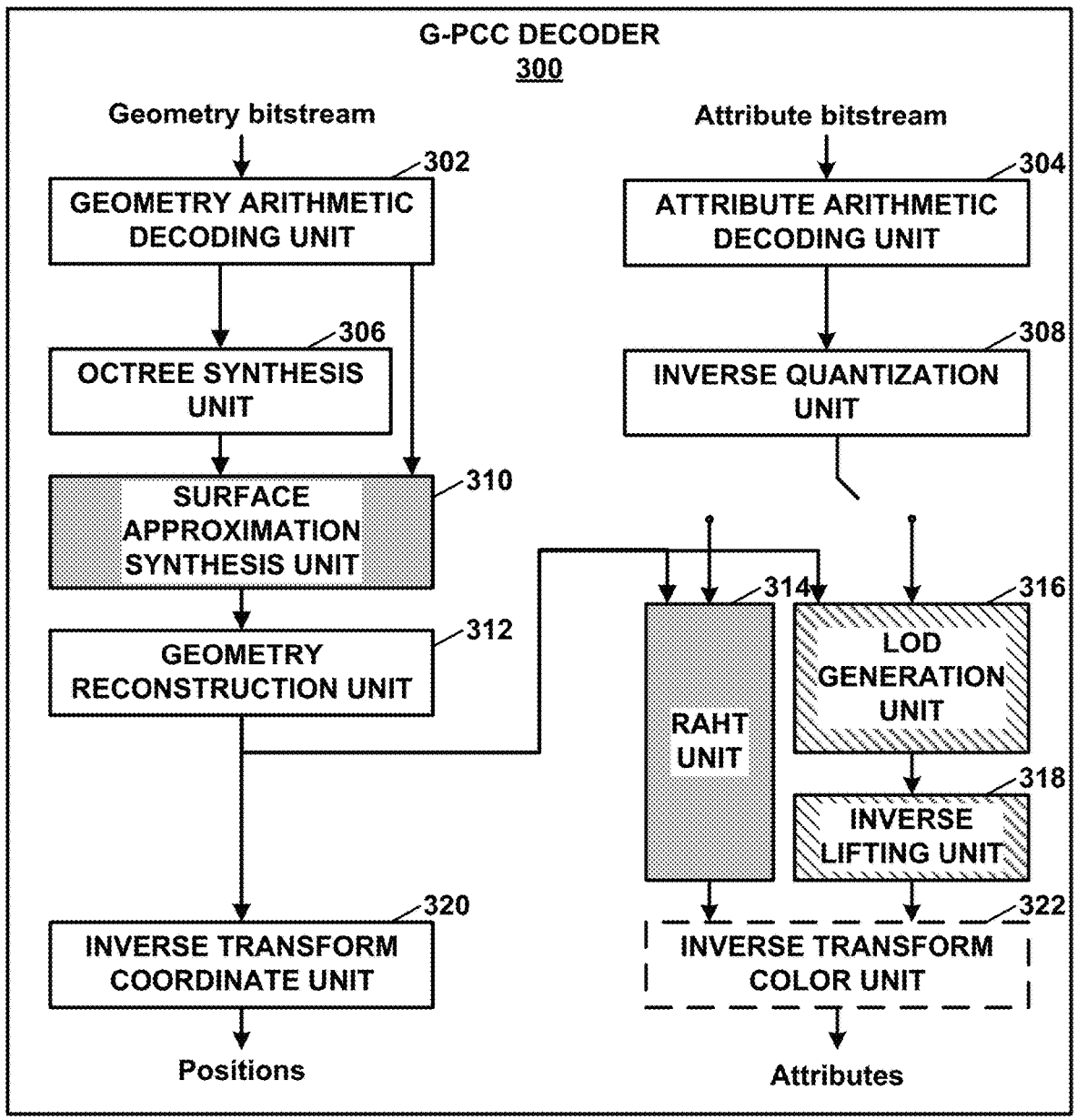
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in a geometry bitstream.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. Alternatively or additionally, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in an attribute bitstream.

In one or more examples, arithmetic encoding unit 226 may be configured to perform the example techniques described in this disclosure. For instance, as described above, in cases where the residual values for all components except one are equal to zero, arithmetic encoding unit 226 may determine a value for the one component that is equal to a magnitude of a residual value of the one component of the attribute minus an offset. Arithmetic encoding unit 226 may encode the value of the one component, and signal the encoded value in the bitstream. Arithmetic encoding unit 226 may also encode the value of zero for the other components except the one component of the attribute, and signal the encoded value of zero for the components except the one component of the attribute.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream and an attribute bitstream. Geometry arithmetic decoding unit 302 of decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Attribute arithmetic decoding unit 304 may be configured to perform the example techniques described in this disclosure. For instance, attribute arithmetic decoding unit 304 may decode values for components of an attribute of a point in the point cloud, the values indicative of residual values for the components. Attribute arithmetic decoding unit 304 may determine that residual values for all components except one component of the attribute are equal to zero, and based on the determination that the residual values for all components except the one component of the attribute are equal to zero, attribute arithmetic decoding unit 304 may add an offset to a decoded value for the one component of the attribute to determine a magnitude of a residual value for the one component.

A reconstruction unit, similar to geometry reconstruction unit 312, may reconstruct the components of the attribute of the point based on the residual values for the components. For instance, the reconstruction unit may add the residual values for each of the components of the attribute of the point to respective values for respective components of a previous point (e.g., previously decoded point).

Octree synthesis unit 306 may synthesize an octree based on syntax elements parsed from the geometry bitstream. In instances where surface approximation is used in the geometry bitstream, surface approximation synthesis unit 310 may determine a surface model based on syntax elements parsed from the geometry bitstream and based on the octree.

Furthermore, geometry reconstruction unit 312 may perform a reconstruction to determine coordinates of points in a point cloud. Inverse transform coordinate unit 320 may apply an inverse transform to the reconstructed coordinates to convert the reconstructed coordinates (positions) of the points in the point cloud from a transform domain back into an initial domain.

Additionally, in the example of FIG. 3, inverse quantization unit 308 may inverse quantize attribute values. The attribute values may be based on syntax elements obtained from the attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. Alternatively, LOD generation unit 316 and inverse lifting unit 318 may determine color values for points of the point cloud using a level of detail-based technique.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

As described above, there may be three different attribute coding methods (i.e., predicting, lifting, and region adaptive hierarchical transform). For every attribute coding method, there may be quantized (or unquantized for lossless coding) residual coefficients (e.g., residual values). The residual coefficients may be highly skewed towards zero values, particularly for high quantization parameters. For efficient coding of frequent zero values, a run-length coding is employed.

FIG. 4 is a flowchart illustrating an example of encoding residual values for G-PCC. For instance, FIG. 4 illustrates the example of using the zerorun syntax element. For color attribute coding, zerorun is defined over all three color components (RGB/YCbCr/YCoCg-R).

In the example of FIG. 4, the residual values for an attribute may be 73, 50, 31, 15, 0, 12, and then N series of zeros. The residual values in FIG. 4 refer to the magnitude of the residual values, and each residual value may be a positive number or a negative number. The "encoded value" shows the values that are to be encoded. Prior to a residual value for an attribute, G-PCC encoder 200 may encode and G-PCC decoder 300 may decode the zerorun syntax element.

For example, zerorun is incremented when all three residual values are zero (e.g., residual values for three color components for a point in the point cloud are 0). Accordingly, for a nonzero color attribute residual value, i.e., not all components have zero residual, the value of zerorun is set to 0.

For instance, because the value of 73 is nonzero, the zerorun syntax element before the residual value of 73 is equal to 0 (e.g., the run length of residual values of zero is 0 because the value is 73). The zerorun syntax element before the residual value of 50 is equal to 0 (e.g., the run length of residual values of zero is 0 because the value is 50). The zerorun syntax element before the residual value of 32 is equal to 0 (e.g., the run length of residual values of zero is 0 because the value is 32). The zerorun syntax element before the residual value of 15 is equal to 0 (e.g., the run length of residual values of zero is 0 because the value is 15).

The residual value that follows the residual value of 15 is one residual value of 0. Therefore, the zerorun syntax element after the residual value of 15 is set equal to 1 to indicate that there is a string of one residual value with the value of 0. The residual value that follows the residual value of 12 is N residual values of 0. Therefore, the zerorun syntax element after the residual value of 12 is set equal to N to indicate that there is a string of N residual values with the value of 0.

For each component, the magnitude and sign are separately coded. Sign is signaled using 1 bit of bypass coding. As illustrated in FIG. 4, each nonzero residual value is subtracted by one.

G-PCC encoder 200 may determine whether the resulting value is equal to 0 (400). For magnitude, if the value is 0 (YES of 400), a flag "isZero" is set to 1 to indicate whether the magnitude is zero (402) and, subsequently, if the magnitude is nonzero (NO of 400), the flag "isZero" is set to 0 (404), and a subsequent flag "isOne" indicating if residual value is equal to 1, is introduced. In zero run length coding, the number of zeros prior to each residual value is counted as zerorun, and then zerorun is encoded instead of encoding a sequence of 0s.

G-PCC encoder 200 may determine if the value is equal to 1 (406). If the value is equal to 1 (YES of 406), G-PCC encoder 200 may set the value of "isOne" to 1 (408). If the value is not equal to one (NO of 406), G-PCC encoder 200 may set the value of "isOne" equal to 0 (410). G-PCC encoder 200 may encode the value −2 to reduce the amount of data that needs to be signaled (412).

The example of FIG. 4 may be applicable where there are two or more components of an attribute with nonzero residual values. However, if there only one component of the attribute with nonzero residual values, G-PCC encoder 200 may encode and signal the residual value for the one component as the value of the one component minus an offset (e.g., 1). However, it may be possible for G-PCC encoder 200 to signal the residual value for the one component in accordance with the example of FIG. 4.

A zerorun parameter is encoded by a truncated unary code with 3 contexts, and an isOne flag is encoded with 7 contexts by using the same way to encode the isZero flag, as one non-limiting example. The above example technique of using zerorun, isZero, and isOne is applied for all three attribute coding schemes (e.g., all three color components may be coded using the same or a similar scheme).

After zerorun, isZero, and isOne, the next steps for coding the residual values involve the coding of remaining absolute values. An "alphabet partition" coding is employed, the details of which can be found in Sehoon Yea, Stephen Wegner, Shan Liu "[GPCC] Alphabet partition coding of transform coefficients," ISO/IEC JTC1/SC29/WG11 MPEG/m52720, Brussels, BE, January 2020." The source code for encoding residuals is shown below. Here, value0, value1 and value2, respectively, indicate the residual value of first, second, and third color components. For example, the first component (e.g., value0) is luma, and other components (e.g., value1 and value 2) are chromas for YCbCr and YCoCg-R coding. There may be similar color components for red-green-blue (RGB) color space.

The code for encoding is as follows:
void
PCCResidualsEncoder::encode(int32_t value0, int32_t value1, int32_t value2)

```
{
  int mag0 = abs(value0);
  int mag1 = abs(value1);
  int mag2 = abs(value2);
  int b0 = (mag0 == 0);
  int b1 = (mag0 <= 1);
  int b2 = (mag1 == 0);
  int b3 = (mag1 <= 1);
  encodeSymbol(mag0, 0, 0, 0);
  encodeSymbol(mag1, 1 + b0, 1 + b1, 1);
  encodeSymbol(mag2, 3 + (b0 << 1) + b2, 3 + (b1 << 1) + b3, 1);
  if (mag0)
    arithmeticEncoder.encode(value0 < 0, binaryModel0);
  if (mag1)
    arithmeticEncoder.encode(value1 < 0, binaryModel0);
```

```
    if (mag2)
        arithmeticEncoder.encode(value2 < 0, binaryModel0);
}
void
PCCResidualsEncoder::encodeSymbol(uint32_t value, int k1, int k2, int k3)
{
    bool isZero = value == 0;
    arithmeticEncoder.encode(isZero, binaryModelIsZero[k1]);
    if (isZero) {
        return;
    }
    bool isOne = value == 1;
    arithmeticEncoder.encode(isOne, binaryModelIsOne[k2]);
    if (isOne) {
        return;
    }
    value -= 2;
    if (value < kAttributeResidualAlphabetSize) {
        encodeInterval(value, k3);
    } else {
        int alphabetSize = kAttributeResidualAlphabetSize;
        encodeInterval(alphabetSize, k3);
        arithmeticEncoder.encodeExpGolomb(value - alphabetSize, 0,
binaryModel0, binaryModelDiff[k1]);
    }
}
```

The corresponding decoding process is shown in the following.

```
uint32_t
PCCResidualsDecoder::decodeSymbol(int k1, int k2, int k3)
{
    if (arithmeticDecoder.decode(binaryModelIsZero[k1]))
        return 0u;
    if (arithmeticDecoder.decode(binaryModelIsOne[k2]))
        return 1u;
    uint32_t value = decodeInterval(k3);
    if (value == kAttributeResidualAlphabetSize) {
        value +=
arithmeticDecoder.decodeExpGolomb(0, binaryModel0,
binaryModelDiff[k1]);
    }
    return value + 2;
}
//-----------------------------------------------------------------
int
PCCResidualsDecoder::decodeInterval(int k3)
{
    // Decoding of interval index
    auto& aed = arithmeticDecoder;
    int setIdx = 0;
    setIdx = (setIdx << 1) | aed.decode(ctxSetIdx[k3][0]);
    setIdx = (setIdx << 1) | aed.decode(ctxSetIdx[k3][1 + setIdx]);
    setIdx = (setIdx << 1) | aed.decode(ctxSetIdx[k3][3 + setIdx]);
    setIdx = (setIdx << 1) | aed.decode(ctxSetIdx[k3][7 + setIdx]);
    // Decode position within interval
    int intervalStart = kCoeffIntervalStart[setIdx];
    int intervalEnd = kCoeffIntervalStart[setIdx + 1];
    int intervalRange = intervalEnd - intervalStart;
    // Number of bits to code is log2(intervalEnd - intervalStart)
    // The following assumes that the range is a power of two
    int symbolIdx = 0;
    for (int mask = intervalRange - 1, i = 0; mask; mask >>= 1, ++i)
        symbolIdx |= aed.decode(ctxSymbolBit[k3]) << i;
    // Reconstruct
    return intervalStart + symbolIdx;
}
//-----------------------------------------------------------------
void
PCCResidualsDecoder::decode(int32_t value [3])
{
    value[0] = decodeSymbol(0, 0, 0);
    int b0 = value[0] == 0;
    int b1 = value[0] <= 1;
    value[1] = decodeSymbol(1 + b0, 1 + b1, 1);
    int b2 = value[1] == 0;
    int b3 = value[1] <= 1;
    value[2] = decodeSymbol(3 + (b0 << 1) + b2, 3 + (b1 << 1) + b3, 1);
    if (value[0] && arithmeticDecoder.decode(binaryModel0))
        value[0] = -value[0];
    if (value[1] && arithmeticDecoder.decode(binaryModel0))
        value[1] = -value[1];
    if (value[2] && arithmeticDecoder.decode(binaryModel0))
        value[2] = -value[2];
}
```

The corresponding syntax and semantics are as follows:

| | Descriptor |
|---|---|
| attribute_data_unit_data( ) {<br>  for( i = 0, zeroRunRem = 0; i < PointCount; i++ ) {<br>    if( --zeroRunRem < 0) {<br>      zero_run_length<br>      zeroRunRem = zero_run_length<br>    }<br>    if( !zeroRunRem )<br>      attribute_coding( i )<br>  }<br>} | <br><br><br>ae(v)<br><br><br><br><br> |

| | Descriptor |
|---|---|
| attribute coding( coeffIdx ) {<br>  for ( c = 0; c < AttrDim; c++) {<br>    coeff_abs_level_gt0_flag[ c ]<br>    if( coeff_abs_level_gt0_flag[ c ] ) {<br>      coeff_abs_level_gt1_flag[ c ]<br>      if( coeff_abs_level_gt1_flag[ c ] )<br>        coeff_abs_level_remaining[ c ]<br>    }<br>    coeff_sign_flag[ c ]<br>  }<br>} | <br><br>ae(v)<br><br>ae(v)<br><br>ae(v)<br><br>ae(v)<br><br> | coeff_abs_level_gt0_flag[c], coeff_abs_level_gt1_flag[c], coeff_abs_level_remaining[c], and coeff_sign_flag[c]

together specify the c-th attribute coefficient component level CoeffLevel[coeffIdx][c]. Positive coefficient levels are represented by coeff_sign_flag[c] equal to 0. Negative coefficient levels are represented by coeff_sign_flag[c] equal to 1. Any of coeff_abs_level_gt0_flag[c], coeff_abs_level_gt1_flag[c], coeff_abs_level_remaining[c], or coeff_sign_flag[c] that are not present are inferred to be 0.

The following pseudo code describes an example for determining CoeffLevel.

```
for (c = 0; c < AttrDim; c++){
    absVal = coeff_abs_level_gt0_flag[c] + coeff_abs_level_gt1_flag[c]
    absVal += coeff_abs_level_remaining[c]
    CoeffLevel[coeffIdx][c] = coeff_sign_flag[c] ? –absVal : absVal
}
```

There may be certain issues in techniques for encoding and decoding residual values for color components. For example, the following encoding and decoding process for color attribute is invoked when zerorun is 0, i.e., not all the components have zero residual values. In some techniques, the magnitude and sign of three components (e.g., three color components) are coded independently. However, where all the residual values are zero (e.g., value0=value1=value2=0), the residual values are also coded, which may be redundant because this process is invoked only when zerorun condition (i.e., all residual values are 0) is false.

The following is source code of how G-PCC encoder 200 and G-PCC decoder 300 may encode or decode the residual values for the color components.

This disclosure describes example techniques to remove the redundant coding of the scenario "value0=value1=value2=0" (e.g., residual value for three color components is equal to 0). As one example, G-PCC encoder 200 or G-PCC decoder 300 may determine that residual values for one or more color components of a point, in the point cloud, are equal to 0 and code (e.g., encode or decode, respectively) the residual values, in a non-independent manner, based on the determination that the residual values for one or more of the color components of the point is equal to 0. Coding in a non-independent manner may mean that a way in which the residual values for at least one color component is coded is based on the residual values for at least another one of the color components. For example, to code the residual values, in the non-independent manner, G-PCC encoder 200 and G-PCC decoder 300 may be configured to code a magnitude of a residual value for one of the color components in a first manner (e.g., signal or decode the actual residual value minus the offset) based on residual values for two other color components being equal 0. For non-independent coding, the first manner is different than a second manner in which to code a magnitude of a residual value for the one of the color components based on residual values for the two other components not being equal to 0.

The above example provides color components as one example attribute, but the example techniques are not limited to color components. For instance, G-PCC encoder 200 or G-PCC decoder 300 may determine that residual values for one or more attributes of a point (e.g., where color component is one example attribute), in the point cloud, are equal to 0 and code (e.g., encode or decode, respectively) the

```
void
PCCResidualsEncoder::encode(int32_t value0, int32_t value1, int32_t value2)
{
    int mag0 = abs(value0);
    int mag1 = abs(value1);
    int mag2 = abs(value2);
    int b0 = (mag0 == 0);
    int b1 = (mag0 <= 1);
    int b2 = (mag1 == 0);
    int b3 = (mag1 <= 1);
    encodeSymbol(mag0, 0, 0, 0);
    encodeSymbol(mag1, 1 + b0, 1 + b1, 1);
    encodeSymbol(mag2, 3 + (b0 << 1) + b2, 3 + (b1 << 1) + b3, 1);
    if (mag0)
        arithmeticEncoder.encode(value0 < 0, binaryModel0);
    if (mag1)
        arithmeticEncoder.encode(value1 < 0, binaryModel0);
    if (mag2)
        arithmeticEncoder.encode(value2 < 0, binaryModel0);
}
void
PCCResidualsDecoder::decode(int32_t value[3])
{
    value[0] = decodeSymbol(0, 0, 0);
    int b0 = value[0] == 0;
    int b1 = value[0] <= 1;
    value[1] = decodeSymbol(1 + b0, 1 + b1, 1);
    int b2 = value[1] == 0;
    int b3 = value[1] <= 1;
    value[2] = decodeSymbol(3 + (b0 << 1) + b2, 3 + (b1 << 1) + b3, 1);
    if (value[0] && arithmeticDecoder.decode(binaryModel0))
        value[0] = –value[0];
    if (value[1] && arithmeticDecoder.decode(binaryModel0))
        value[1] = –value[1];
    if (value[2] && arithmeticDecoder.decode(binaryModel0))
        value[2] = –value[2];
}
``` residual values, in a non-independent manner, based on the determination that the residual values for one or more of the attributes of the point is equal to 0. Coding in a non-independent manner may mean that a way in which the residual values for at least one attribute is coded is based on the residual values for at least another one of the attributes. For example, to code the residual values, in the non-independent manner, G-PCC encoder 200 and G-PCC decoder 300 may be configured to code a residual value for one of the attributes in a first manner based on residual values for two other color components being equal 0. For non-independent coding, the first manner is different than a second manner in which to code a residual value for the one of the attributes based on residual values for the two other components not being equal to 0.

As noted above, color component is one example attribute of a point. Other examples of attributes include frame number, humidity, temperature, surface normal, etc. In some examples, the attributes of a point may be grouped. For example, (color [3 comp], frame number [1 comp]) may be grouped together for a total of 4 components. Humidity and temperature may be grouped together for a total of 2 components (e.g., for weather specific description, etc.). Color component [3 comp] and surface normal [3 comp] for a total of 6 components (e.g., for light-field representation) may be additional examples of attributes.

For instance, one example technique is to signal abs(value2)−1 instead of abs(value2) for the magnitude part, as abs(value2) should be greater than 0. Stated another way, from the perspective of G-PCC encoder 200, based on the determination that the residual values for all components except the one component of the attribute are equal to zero, G-PCC encoder 200 may determine a value for the one component that is equal to a magnitude of a residual value of the one component of the attribute minus an offset. G-PCC encoder 200 may encode the value for the one component, and signal the encoded value in a bitstream. From the perspective of G-PCC decoder 300, G-PCC decoder 300 may decode values for components of an attribute of a point in the point cloud, the values indicative of residual values for the components. G-PCC decoder 300 may determine that residual values for all components except one component of the attribute are equal to zero. Based on the determination that the residual values for all components except the one component of the attribute are equal to zero, G-PCC decoder 300 may add an offset to a decoded value for the one component of the attribute to determine a magnitude of a residual value for the one component.

The corresponding source code for encoding and decoding processes are as follows. Also, although described with respect to value2, the example techniques may be extended to value0 or value1. That is, value2 may be the residual value for any of the color components of a point. In the following, the portion within <ADD> . . . </ADD> show additions to the source code.

```
void
PCCResidualsEncoder::encode(int32_t value0, int32_t value1, int32_t value2)
{
    int mag0 = abs(value0);
    int mag1 = abs(value1);
    int mag2 = abs(value2);
    int b0 = (mag0 == 0);
    int b1 = (mag0 <= 1);
    int b2 = (mag1 == 0);
    int b3 = (mag1 <= 1);
    encodeSymbol(mag0, 0, 0, 0);
    encodeSymbol(mag1, 1 + b0, 1 + b1, 1);
    <ADD> if(b0&&b2)
        encodeSymbol(mag2 − 1, 3 + (b0 << 1) + b2, 3 + (b1 << 1) + b3, 1);
    else </ADD>
        encodeSymbol(mag2, 3 + (b0 << 1) + b2, 3 + (b1 << 1) + b3, 1);
    if (mag0)
        arithmeticEncoder.encode(value0 < 0, binaryModel0);
    if (mag1)
        arithmeticEncoder.encode(value1 < 0, binaryModel0);
    if (mag2)
        arithmeticEncoder.encode(value2 < 0, binaryModel0);
}
void
PCCResidualsDecoder::decode(int32_t value [3])
{
    value[0] = decodeSymbol(0, 0, 0);
    int b0 = value[0] == 0;
    int b1 = value[0] <= 1;
    value[1] = decodeSymbol(1 + b0, 1 + b1, 1);
    int b2 = value[1] == 0;
    int b3 = value[1] <= 1;
    <ADD> if (b0 && b2)
        value[2] = 1 + decodeSymbol(3 + (b0 << 1) + b2, 3 + (b1 << 1) +
          b3, 1);
    else </ADD>
    value[2] = decodeSymbol(3 + (b0 << 1) + b2, 3 + (b1 << 1) + b3, 1);
    if (value[0] && arithmeticDecoder.decode(binaryModel0))
        value[0] = −value[0];
    if (value[1] && arithmeticDecoder.decode(binaryModel0))
        value[1] = −value[1];
    if (value[2] && arithmeticDecoder.decode(binaryModel0))
        value[2] = −value[2];
}
```

In the above example source code, G-PCC encoder 200 and G-PCC decoder 300 may determine that the residual values for two color components of the point are equal to 0 (e.g., if (b0&&b2) is true where b0 is true if value0 for the first chroma component is zero and b2 is true if value1 for the second chroma component is zero). In such examples, to code the residual values, in the non-independent manner, based on the determination that the residual values for one or more of the color components of the point is equal to 0, G-PCC encoder 200 and G-PCC decoder 300 may code a residual value for a third color component based on an offset (e.g., the offset value is 1). For example, to code the residual value for the third color component based on the offset, G-PCC encoder 200 and G-PCC decoder 300 may code the residual value for the third color component by subtracting the offset for encoding or adding the offset for decoding.

In general, for a N dimensional attribute, if for a first (N−1) component, the residuals are all zero, i.e., value(0)=value(1)= . . . =value(N−2)=0, for N-th component, for the magnitude part abs(value(N−1)−1) is coded instead of abs(value(N−1)).

In some cases, the bit-savings may be encountered when two of the residuals have a value of 0 (e.g., residual values for two of the color components are 0), so that while coding the third residual (e.g., residual value for third color component), the residual value of the third color component can be inferred to not be 0 (e.g., the value cannot be 0). As value0 indicates luma residuals (e.g., residual value for luma color component), and value1/value2 indicates chroma residuals (e.g., residual values for chroma color components), the chance of value1=value2=0 (chroma residuals are zero) is higher than value0=value1=0.

Accordingly, in some examples, the coding of value1 and value2 before coding of value 0 (i.e., changing the order of coding) may result in more bit-savings. An example way of handling the redundancy, described above, is to code value1 and value2 before value0, and code abs(value0)−1 instead of abs(value0) for the magnitude part, when value1=value2=0.

The corresponding source code for encoding and decoding processes are as follows. In the source code, value0 refers to the luma component, and value1 and value2 are for chroma components. In the following, the portion within <ADD> . . . </ADD> show additions to the source code.

```
void
PCCResidualsEncoder::encode(int32_t value0, int32_t value1, int32_t value2)
{
  <ADD> int mag1 = abs(value1);
  int mag2 = abs(value2);
  int mag0 = abs(value0);
  int b0 = (mag1 == 0);
  int b1 = (mag1 <= 1);
  int b2 = (mag2 == 0);
  int b3 = (mag2 <= 1);
  encodeSymbol(mag1, 0, 0, 1);
  encodeSymbol(mag2, 1 + b0, 1 + b1, 1);
  if (b0 && b2) {
     assert(mag0 > 0);
     encodeSymbol(mag0 − 1, 3 + (b0 << 1) + b2, 3 + (b1 << 1) + b3, 0);
  }
  else
     encodeSymbol(mag0, 3 + (b0 << 1) + b2, 3 + (b1 << 1) + b3, 0);
  </ADD>
  if (mag0)
     arithmeticEncoder.encode(value0 < 0, binaryModel0);
  if (mag1)
     arithmeticEncoder.encode(value1 < 0, binaryModel0);
  if (mag2)
     arithmeticEncoder.encode(value2 < 0, binaryModel0);
}
void
PCCResidualsDecoder::decode(int32_t value[3])
{
  <ADD> value[1] = decodeSymbol(0, 0, 1);
  int b0 = value[1] == 0;
  int b1 = value[1] <= 1;
  value[2] = decodeSymbol(1 + b0, 1 + b1, 1);
  int b2 = value[2] == 0;
  int b3 = value[2] <= 1;
  value[0] = decodeSymbol(3 + (b0 << 1) + b2, 3 + (b1 << 1) + b3, 0);
  if (b0 && b2)
     value[0] += 1; </ADD>
  if (value[0] && arithmeticDecoder.decode(binaryModel0))
     value[0] = −value[0];
  if (value[1] && arithmeticDecoder.decode(binaryModel0))
     value[1] = −value[1];
  if (value[2] && arithmeticDecoder.decode(binaryModel0))
     value[2] = −value[2];
}
```

In the above example source code, G-PCC encoder 200 and G-PCC decoder 300 may determine that the residual values for chroma color components of the point are equal to 0 (e.g., if(b0&&b2) is true, where b0 is true if value1 for the first chroma component is zero and b2 is true if value2 for the second chroma component is zero). In this example, to code the residual values, in the non-independent manner, based on the determination that the residual values for one or more of the color components of the point is equal to 0, G-PCC encoder 200 and G-PCC decoder 300 may code a residual value for a luma color component of the point based on an offset (e.g., add offset of 1 for encoding and subtract offset of 1 for decoding).

In this example, to code the residual values, G-PCC encoder 200 and G-PCC decoder 300 may code chroma color components before coding a luma color component of the residual values. In some examples, even if the residual values for the two chroma color components are non-zero, G-PCC encoder 200 and G-PCC decoder 300 may code chroma color components before coding a luma color component of the residual values.

In general, for a N dimensional attribute, if for last (N−1) component, the residuals are all zero, i.e., value(1)=value(2)= . . . =value(N−1)=0, for 0-th component, the magnitude part abs(value(0)−1) is coded instead of abs (value(0)).

The above provides examples with color components as one example of attributes. In general, there may be one or more components for an attribute of a point, and the example techniques may be extended to examples for one or more components of an attribute. For instance, an attribute of a point may include one or more components. As an example, an attribute may be normal vector to surface, color component, coordinate including time (x, y, z), or a group. The group could be other attributes like normal vector to surface. Additional examples of a group may be three color components and a frame number for a total of four components, humidity and temperature (e.g., for weather specific description, etc.) for a total of two components, or three color components and three components to define a surface normal for a total of six components (e.g., for a light-field representation).

Accordingly, in one or more examples, G-PCC encoder 200 and G-PCC decoder 300 may determine that residual values for one or more components for an attribute of a point, in the point cloud, are equal to 0. In one or more examples, an attribute may include only one component, in which case the attribute and the component may be the same (e.g., frame number). In one or more examples, an attribute may include a plurality of components. For instance, for a color attribute, there may be three color components (e.g., RGB or YCbCr), for a surface normal attribute, there may be three components (e.g., x, y, z), for a weather description attribute, there may be two or more components (e.g., humidity and temperature, etc.), and for a light-field representation attribute, there may be six components (e.g., three color components and three components for surface normal). The above are some examples of attributes and color components, and the techniques should not be considered limited to the above examples, and other types of attributes and components may be utilized. In one or more examples, G-PCC encoder 200 and G-PCC decoder 300 may code (e.g., encode or decode) the residual values, in a non-independent manner, based on the determination that the residual values for one or more components for the attributes of the point are equal to 0.

The corresponding changes in syntax and semantics are as follows. In the following, the portion within <ADD> . . . </ADD> show additions to the source code.

|  | Descriptor |
|---|---|
| attribute_coding( coeffIdx ) { | |
|   for ( c = 0, <ADD> lastCompIsSignificant = | |
| 1 </ADD>; c < AttrDim; c++ ) { | |
|     coeff_abs_level_gt0_flag[ c ] | ae(v) |
|     if( coeff_abs_level_gt0_flag[ c ] ) { | |
|       coeff_abs_level_gt1_flag[ c ] | ae(v) |
|       if( coeff_abs_level_gt1_flag[c ] ) | |
|         coeff_abs_level_remaining[ c ] | ae(v) |
|     } | |
|     <ADD>signPresent = coeff_abs_level_gt0_flag[ c ] | |
|       \|\|(c == AttrDim − 1 && lastCompIsSignificant ) | |
|     if( signPresent ) </ADD> | |
|       coeff_sign_flag[ c ] | ae(v) |
|     <ADD> lastCompIsSignificant &= | |
| !coeff_abs_level_gt0_flag[ c ]</ADD> | |
|   } | |
| } | | coeff_abs_level_gt0_flag[c], coeff_abs_level_gt1_flag[c], coeff_abs_level_remaining[c], and coeff_sign_flag[c] together specify the c-th attribute coefficient component level CoeffLevel[coeffIdx][c]. Positive coefficient levels are represented by coeff_sign_flag[c] equal to 0. Negative coefficient levels are represented by coeff_sign_flag[c] equal to 1. Any of coeff_abs_level_gt0_flag[c], coeff_abs_level_gt1_flag[c], coeff_abs_level_remaining[c], or coeff_sign_flag[c] that are not present are inferred to be 0.

The following pseudo code may be part of the operations in accordance with one or more examples described in this disclosure.

```
<ADD> lastCompIsSignificant = 1; </ADD>
for (c = 0; c < AttrDim; c++){
    absVal = coeff_abs_level_gt0_flag[c] + coeff_abs_level_gt1_flag[c]
    absVal += coeff_abs_level_remaining[c]
<ADD> if (c == AttrDim − 1 && !zeroRunRem)
        if (lastCompIsSignificant)
            absVal++;
lastCompIsSignificant &= !coeff_abs_level_gt0_flag[ c ]
CoeffLevel[coeffIdx][(c+1) % AttrDim] </ADD> = coeff_sign_flag[c] ?
−absVal : absVal
}
```

Figure 5:
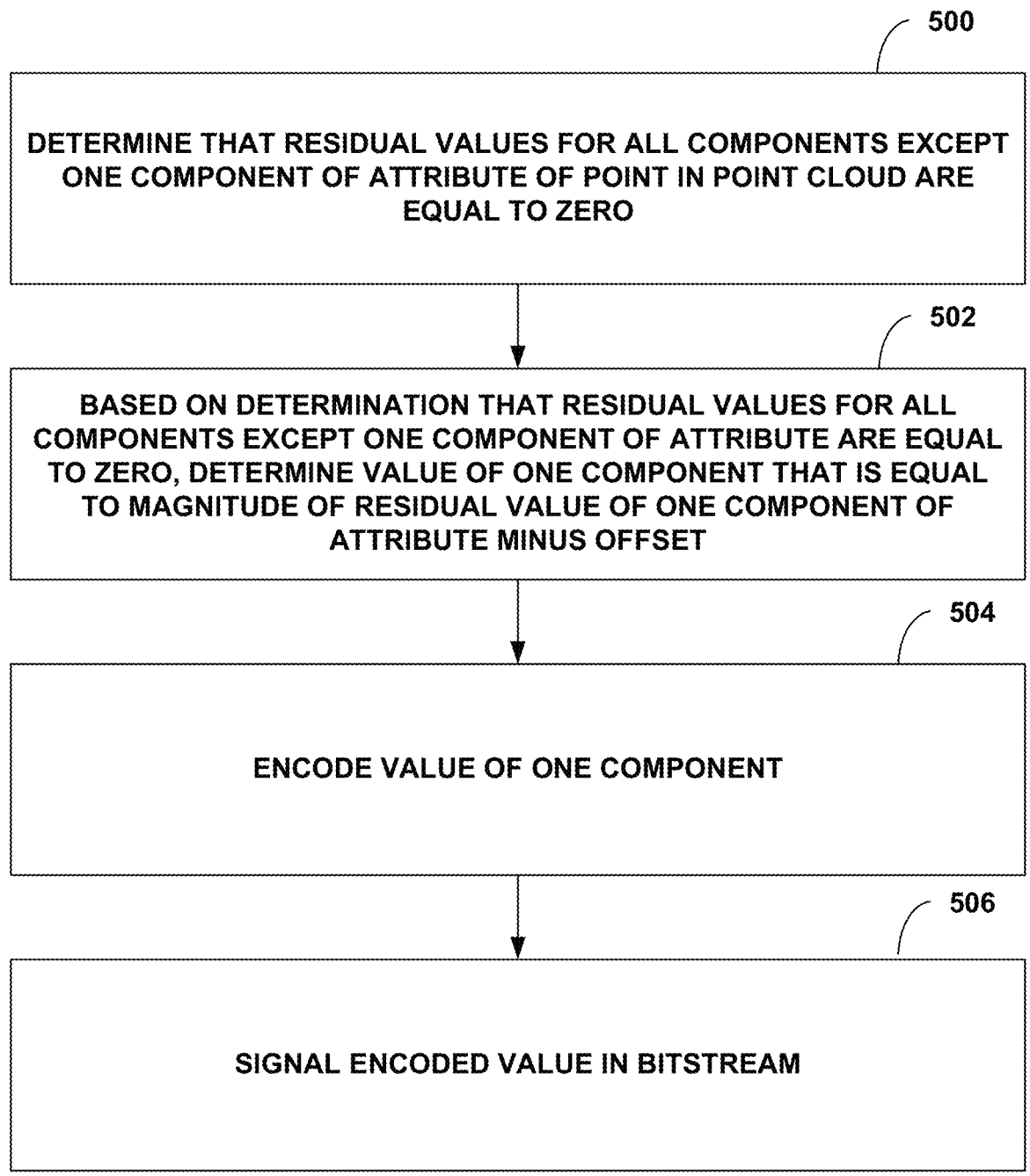
FIG. 5 is a flowchart illustrating an example method of encoding a point cloud.

FIG. 5 is a flowchart illustrating an example method of encoding a point cloud. For ease of illustration, the example of FIG. 5 is described with respect to G-PCC encoder 200. For instance, memory 106 and/or memory of G-PCC encoder 200 may be configured to store a point cloud. Also, the example is described with respect to color attributes for ease, but may be applicable to other attributes as well. Examples of the attribute include a color, frame number, humidity, temperature, surface normal, a combination of humidity and temperature, or a combination of color and surface normal.

Processing circuitry of G-PCC encoder 200 may be configured to determine that residual values for all components except one component of an attribute of a point in the point cloud are equal to zero (500). For example, G-PCC encoder 200 may determine that residual values for the two chroma components are equal to zero, but the residual value for the luma component is not equal to zero. In this example, the luma component is the one component of the attribute, and all components except the one component are the two chroma components.

Based on the determination that the residual values for all components except the one component of the attribute are equal to zero, processing circuitry of G-PCC encoder 200 may determine a value for the one component that is equal to a magnitude of a residual value of the one component of the attribute minus an offset (502). One example of the offset is an offset equal to 1, although other integer or non-integer values are possible.

As one example, the zerorun syntax element may be false indicating that the residual value for at least one component of the attribute should not be equal to zero. Therefore, if the residual values for all components prior to the one component are equal to zero, the residual value for the one component (e.g., luma component) should not be equal to zero. In such cases, rather than signaling the actual residual value for the one component, the processing circuitry of G-PCC encoder 200 may determine the value for the one component (e.g., luma component) that is equal to the residual value of the one component (e.g., luma component) minus an offset (e.g., 1).

The processing circuitry of G-PCC encoder 200 may encode the value of the one component (504). The processing circuitry of G-PCC encoder 200 may signal the encoded value in a bitstream (506).

The processing circuitry of G-PCC encoder 200 may also encode the value of zero for the components except the one component of the attribute, and signal the encoded value of zero for the components except the one component of the attribute. For example, the processing circuitry of G-PCC encoder 200 may encode the value of zero for the two chroma components, and signal the encoded value of zero for the two chroma components.

The processing circuitry of G-PCC encoder 200 may encode the one component having the nonzero residual values last, and after encoding the components having the residual value of 0. For example, to encode the value of zero for the components except the one component of the attribute, the processing circuitry of G-PCC encoder 200 may be configured to encode the value of zero for the components except the one component of the attribute before encoding the value of the one component. As an example, the processing circuitry of G-PCC encoder 200 may encode the residual value of zero for the two chroma components before encoding the value of the luma component (e.g., before encoding the value of the residual value of the luma component minus the offset).

In some examples, there may be a processing order for the components. For instance, the processing order for the color attribute may be to process a luma component before chroma components. However, as described above, in some examples, the processing circuitry of G-PCC encoder 200 may encode the residual values for the chroma components first before encoding the value for the luma component (e.g., the value is equal to the residual value of the luma component minus the offset).

Accordingly, in a processing order, the one component (e.g., luma component) is processed before the other components (e.g., the chroma components). However, to encode the value of zero for the components except the one component of the attribute before encoding the value of the one component, the processing circuitry of G-PCC encoder 200 may be configured to encode in an encoding order different than the processing order, in which residual values for the components except the one component are encoded before encoding the value of the one component. That is, G-PCC encoder 200 may encode in an encoding order in which the residual values for the chroma component are encoded before encoding the value of the luma component. For instance, in the encoding order the one component is encoded after the components except the one component.

The above example techniques may be applicable to examples where the residual values for all components except the one component are equal to zero. In cases where the residual values for two or more components are equal or not equal to zero, the encoding techniques may be different. For instance, the point in the example of FIG. 5 may be a first point. The processing circuitry of G-PCC encoder 200 may determine that residual values for at least two components of components of an attribute of a second point in the point cloud are not equal to zero. In this example, the processing circuitry of G-PCC encoder 200 may encode the residual values for the components of the attribute of the second point.

Figure 6:
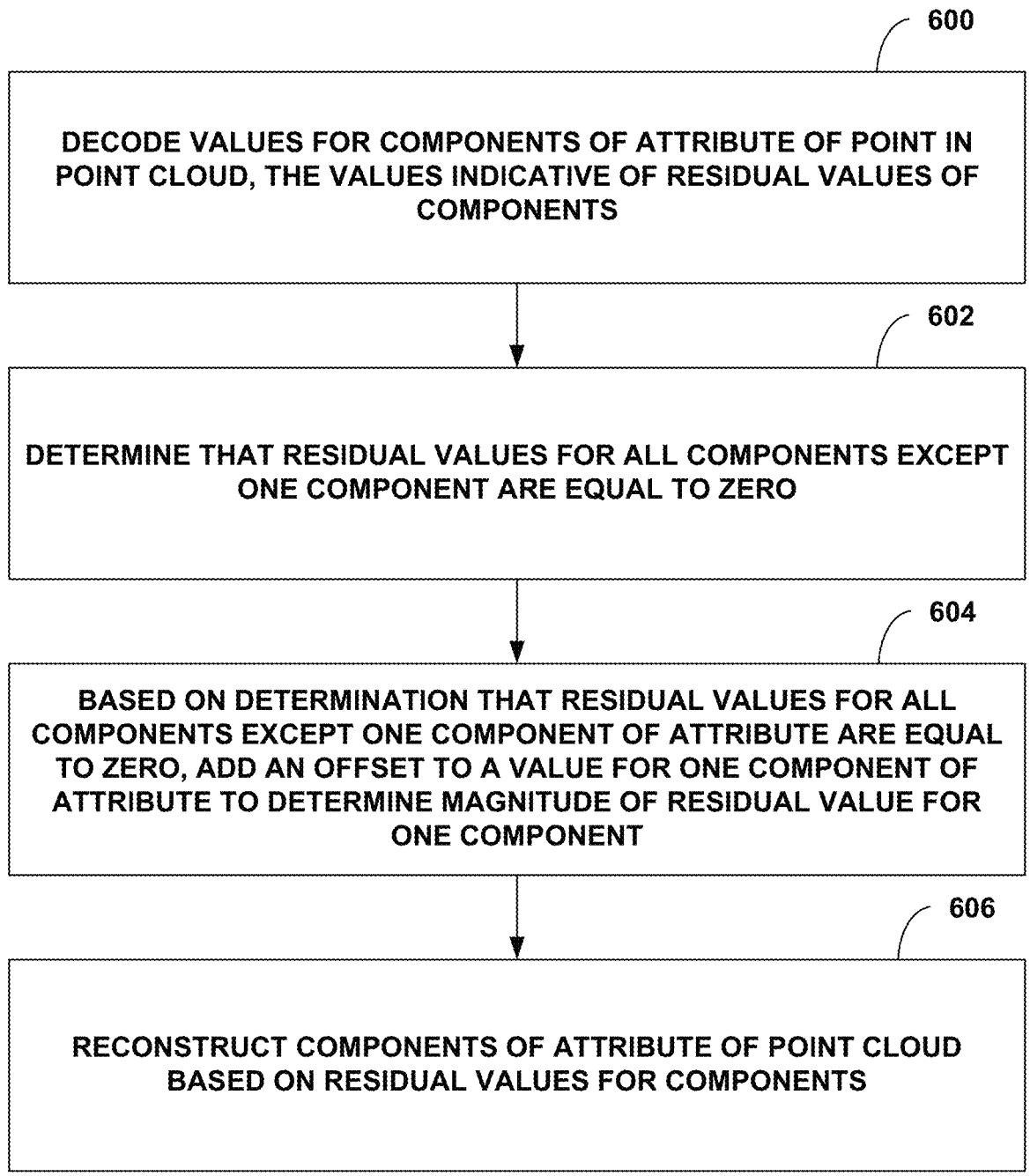
FIG. 6 is a flowchart illustrating an example method of decoding a point cloud.

FIG. 6 is a flowchart illustrating an example method of decoding a point cloud. For ease of illustration, the example of FIG. 6 is described with respect to G-PCC decoder 300. For instance, memory 120 and/or memory of G-PCC decoder 300 may be configured to store a point cloud. Also, like FIG. 5, the example is described with respect to color attributes for ease, but may be applicable to other attributes as well. Examples of the attribute include a color, frame number, humidity, temperature, surface normal, a combination of humidity and temperature, or a combination of color and surface normal.

Processing circuitry of G-PCC decoder 300 may be configured to decode values for components of an attribute of a point in the point cloud, the values indicative of residual values for the components (600). For example, G-PCC decoder 300 may decode values for chroma and luma components of the color attribute.

Processing circuitry of G-PCC decoder 300 may be configured to determine that residual values for all components except one component of the attribute are equal to zero (602). For example, G-PCC decoder 300 may determine that residual values for the two chroma components are equal to zero. Because the zerorun syntax element may indicate that the residual value for the color attribute is nonzero, G-PCC decoder 300 may determine that the residual value for the luma component is not equal to zero. Also, G-PCC decoder 300 may decode a value for the luma component indicative of the magnitude of the residual value for the luma component that is nonzero. However, it is possible that the decoded value for the luma component is zero, such as where the actual residual value (e.g., actual magnitude of the residual value) for the luma component is equal to one and the offset to which the decoded value is added is equal to one. In the case that the decoded value for the luma component is equal to zero, G-PCC decoder 300 may determine that the actual residual value for the luma component cannot be zero because the zerorun syntax element was false (e.g., did not indicate that the residual value for the color attribute is equal to zero).

The processing circuitry of G-PCC decoder 300 may decode the value of zero for the components except the one component. For example, for the two chroma components, the processing circuitry of G-PCC decoder 300 may decode the value of zero.

Based on the determination that the residual values for all components except the one component of the attribute are equal to zero, the processing circuitry of G-PCC decoder 300 may add an offset to a decoded value for the one component of the attribute to determine a magnitude of a residual value for the one component (604). One example of the offset is an offset equal to 1.

As one example, because the decoded values for all other components except the one component is equal to zero, G-PCC decoder 300 may determine that the decoded value for the one component is the actual residual value of the one component plus the offset. Therefore, to determine the residual value for the one component (e.g., luma component), the processing circuitry of G-PCC decoder 300 may add the offset to the decoded value for the one component.

Processing circuitry of G-PCC decoder 300 may reconstruct the components of the attribute of the point based on the residual values for the components (606). For example, the processing circuitry of G-PCC decoder 300 may add the residual values for the components to respective component values for component of a previous point (e.g., previously decoded point) to reconstruct the components of the attribute of the point.

The processing circuitry of G-PCC decoder 300 may decode the one component having the nonzero residual value last, and after decoding the components having the residual value of 0. For example, to decode the value of zero for the components except the one component of the attribute, the processing circuitry of G-PCC decoder 300 may be configured to decode the value of zero for the components except the one component of the attribute before decoding the value of the one component. As an example, the processing circuitry of G-PCC decoder 300 may decode the residual value of zero for the two chroma components before decoding the value of the luma component (e.g., before decoding the value of the residual value of the luma component minus the offset).

As described above, there may be a processing order for the components. For instance, the processing order for the color attribute may be to process the luma component before chroma components. However, as described above, in some examples, the processing circuitry of G-PCC decoder 300 may decode the residual values for the chroma components first before decoding the value for the luma component (e.g., the value is equal to the residual value of the luma component minus the offset).

Accordingly, in a processing order, the one component (e.g., luma component) is processed before the components except the one component (e.g., the chroma components). However, to decode the value of zero for the components except the one component of the attribute before decoding the value of the one component, the processing circuitry of G-PCC decoder 300 may be configured to decode, in a decoding order different than the processing order, in which residual values for the components except the one component are decoded before decoding the value of the one component. That is, G-PCC decoder 300 may decode in a decoding order in which the residual values for the chroma component are decoded before decoding the value of the luma component. For instance, in the decoding order the one component is decoded after the components except the one component.

The above example techniques may be applicable to examples where the residual value for all components except the one component is equal to zero. In cases where the residual value for two or more components is equal is not equal to zero, the decoding techniques may be different. For instance, the point in the example of FIG. 6 may be a first point. The processing circuitry of G-PCC decoder 300 may determine that residual values for at least two components of components of an attribute of a second point in the point cloud are not equal to zero. In this example, the processing circuitry of G-PCC decoder 300 may decode the residual values for the components of the attribute of the second point.

Figure 7:
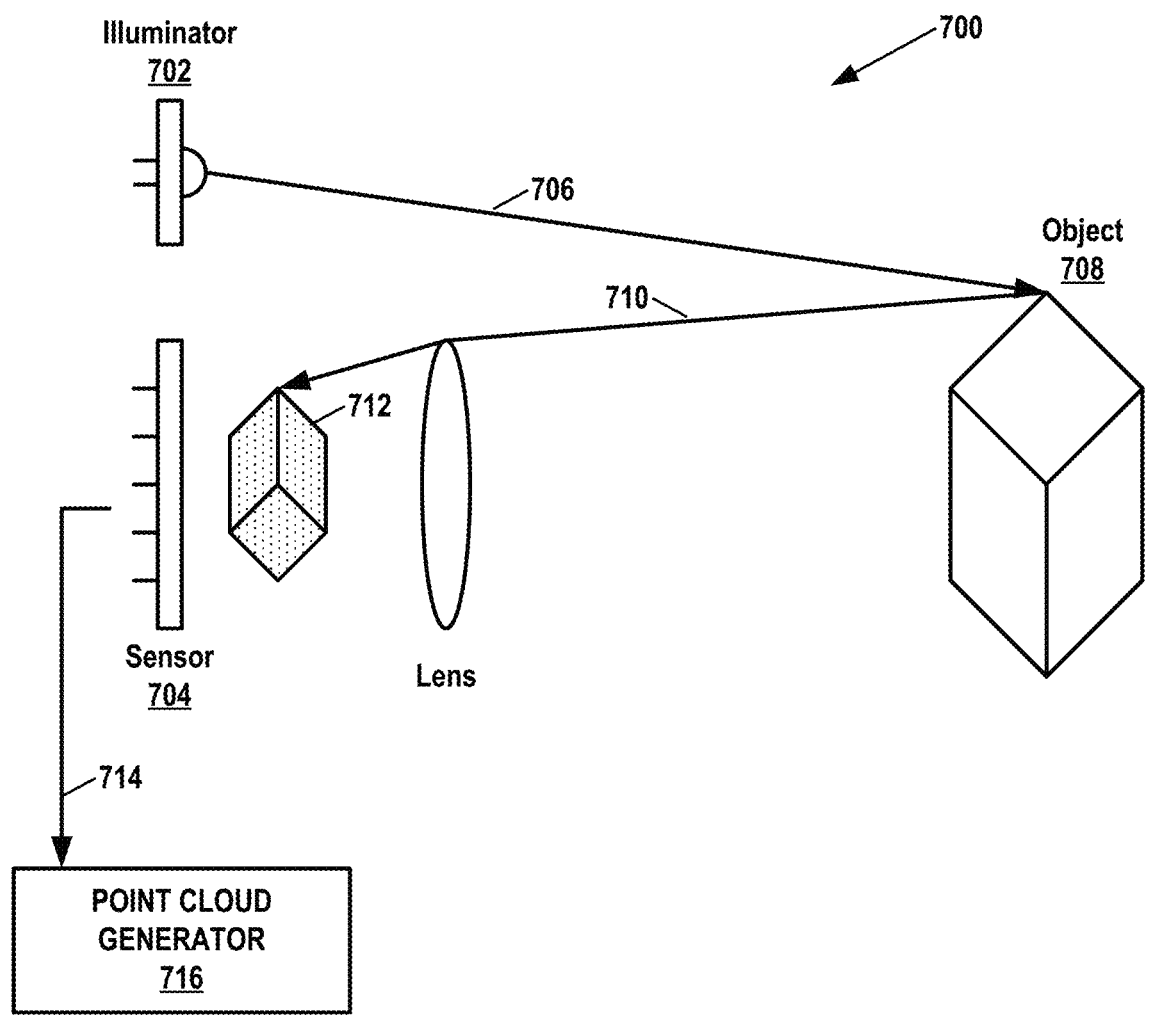
FIG. 7 is a conceptual diagram illustrating an example range-finding system that may be used with one or more techniques of this disclosure.

FIG. 7 is a conceptual diagram illustrating an example range-finding system 700 that may be used with one or more techniques of this disclosure. In the example of FIG. 7, range-finding system 700 includes an illuminator 702 and a sensor 704. Illuminator 702 may emit light 706. In some examples, illuminator 702 may emit light 706 as one or more laser beams. Light 706 may be in one or more wavelengths, such as an infrared wavelength or a visible light wavelength. In other examples, light 706 is not coherent, laser light. When light 706 encounters an object, such as object 708, light 706 creates returning light 710. Returning light 710 may include backscattered and/or reflected light. Returning light 710 may pass through a lens 711 that directs returning light 710 to create an image 712 of object 708 on sensor 704. Sensor 704 generates signals 714 based on image 712. Image 712 may comprise a set of points (e.g., as represented by dots in image 712 of FIG. 7).

In some examples, illuminator 702 and sensor 704 may be mounted on a spinning structure so that illuminator 702 and sensor 704 capture a 360-degree view of an environment. In other examples, range-finding system 700 may include one or more optical components (e.g., mirrors, collimators, diffraction gratings, etc.) that enable illuminator 702 and sensor 704 to detect ranges of objects within a specific range (e.g., up to 360-degrees). Although the example of FIG. 7 only shows a single illuminator 702 and sensor 704, range-finding system 700 may include multiple sets of illuminators and sensors.

In some examples, illuminator 702 generates a structured light pattern. In such examples, range-finding system 700 may include multiple sensors 704 upon which respective images of the structured light pattern are formed. Range-finding system 700 may use disparities between the images of the structured light pattern to determine a distance to an object 708 from which the structured light pattern backscatters. Structured light-based range-finding systems may have a high level of accuracy (e.g., accuracy in the sub-millimeter range), when object 708 is relatively close to sensor 704 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 700 is a time of flight (ToF)-based system. In some examples where range-finding system 700 is a ToF-based system, illuminator 702 generates pulses of light. In other words, illuminator 702 may modulate the amplitude of emitted light 706. In such examples, sensor 704 detects returning light 710 from the pulses of light 706 generated by illuminator 702. Range-finding system 700 may then determine a distance to object 708 from which light 706 backscatters based on a delay between when light 706 was emitted and detected and the known speed of light in air). In some examples, rather than (or in addition to) modulating the amplitude of the emitted light 704, illuminator 702 may modulate the phase of the emitted light 704. In such examples, sensor 704 may detect the phase of returning light 710 from object 708 and determine distances to points on object 708 using the speed of light and based on time differences between when illuminator 702 generated light 706 at a specific phase and when sensor 704 detected returning light 710 at the specific phase.

In other examples, a point cloud may be generated without using illuminator 702. For instance, in some examples, sensors 704 of range-finding system 700 may include two or more optical cameras. In such examples, range-finding system 700 may use the optical cameras to capture stereo images of the environment, including object 708. Range-finding system 700 may include a point cloud generator 716 that may calculate the disparities between locations in the stereo images. Range-finding system 700 may then use the disparities to determine distances to the locations shown in the stereo images. From these distances, point cloud generator 716 may generate a point cloud.

Sensors 704 may also detect other attributes of object 708, such as color and reflectance information. In the example of FIG. 7, a point cloud generator 716 may generate a point cloud based on signals 714 generated by sensor 704. Range-finding system 700 and/or point cloud generator 716 may form part of data source 104 (FIG. 1). Hence, a point cloud generated by range-finding system 700 may be encoded and/or decoded according to any of the techniques of this disclosure.

Figure 8:
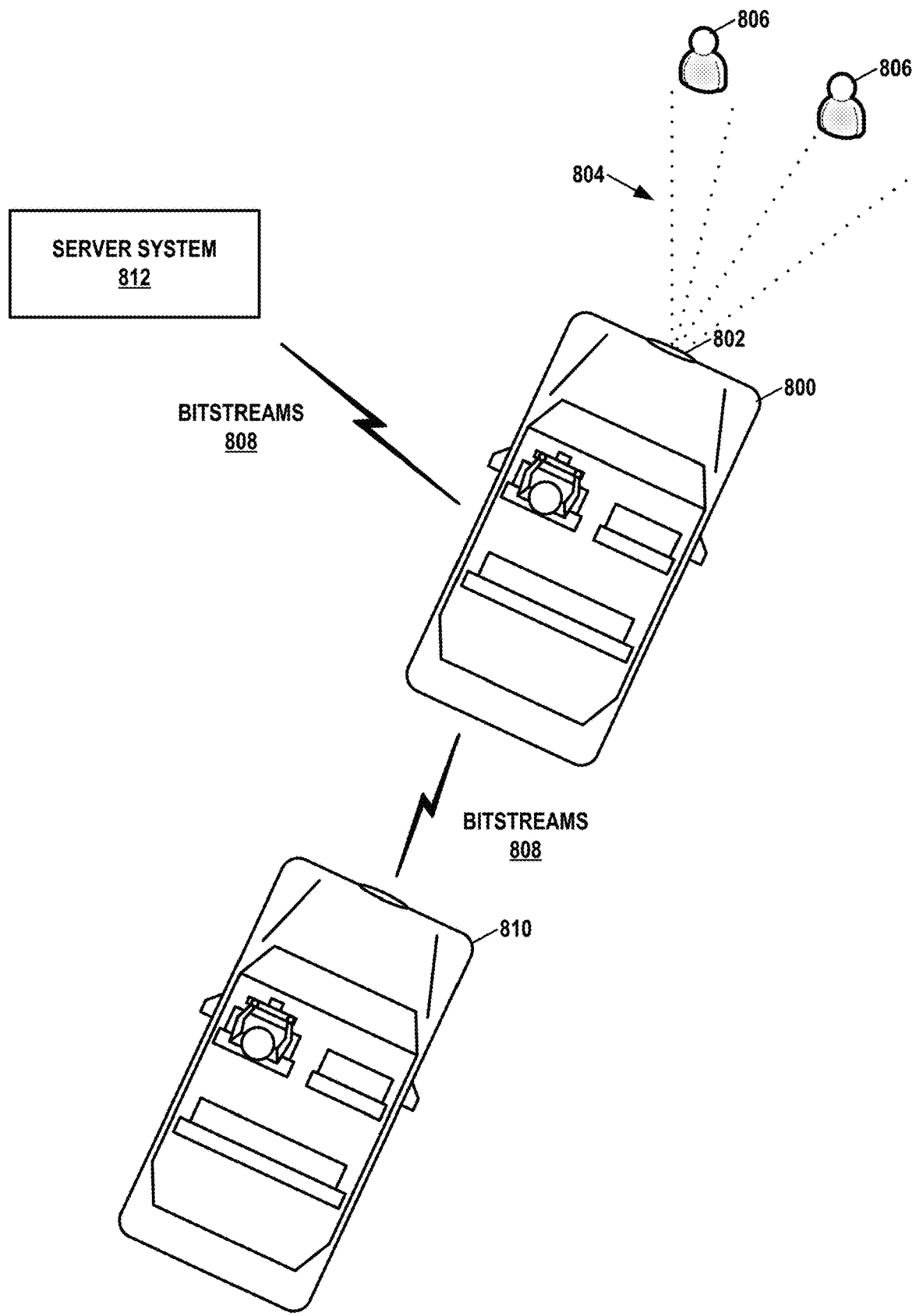
FIG. 8 is a conceptual diagram illustrating an example vehicle-based scenario in which one or more techniques of this disclosure may be used.

FIG. 8 is a conceptual diagram illustrating an example vehicle-based scenario in which one or more techniques of this disclosure may be used. In the example of FIG. 8, a vehicle 800 includes a range-finding system 802. Range-finding system 802 may be implemented in the manner discussed with respect to FIG. 8. Although not shown in the example of FIG. 8, vehicle 800 may also include a data source, such as data source 104 (FIG. 1), and a G-PCC encoder, such as G-PCC encoder 200 (FIG. 1). In the example of FIG. 8, range-finding system 802 emits laser beams 804 that reflect off pedestrians 806 or other objects in a roadway. The data source of vehicle 800 may generate a point cloud based on signals generated by range-finding system 802. The G-PCC encoder of vehicle 800 may encode the point cloud to generate bitstreams 808, such as geometry bitstream (FIG. 2) and attribute bitstream (FIG. 2). Bitstreams 808 may include many fewer bits than the unencoded point cloud obtained by the G-PCC encoder.

An output interface of vehicle 800 (e.g., output interface 108 (FIG. 1) may transmit bitstreams 808 to one or more other devices. Bitstreams 808 may include many fewer bits than the unencoded point cloud obtained by the G-PCC encoder. Thus, vehicle 800 may be able to transmit bitstreams 808 to other devices more quickly than the unencoded point cloud data. Additionally, bitstreams 808 may require less data storage capacity.

In the example of FIG. 8, vehicle 800 may transmit bitstreams 808 to another vehicle 810. Vehicle 810 may include a G-PCC decoder, such as G-PCC decoder 300 (FIG. 1). The G-PCC decoder of vehicle 810 may decode bitstreams 808 to reconstruct the point cloud. Vehicle 810 may use the reconstructed point cloud for various purposes. For instance, vehicle 810 may determine based on the reconstructed point cloud that pedestrians 806 are in the roadway ahead of vehicle 800 and therefore start slowing down, e.g., even before a driver of vehicle 810 realizes that pedestrians 806 are in the roadway. Thus, in some examples, vehicle 810 may perform an autonomous navigation operation based on the reconstructed point cloud.

Additionally or alternatively, vehicle 800 may transmit bitstreams 808 to a server system 812. Server system 812 may use bitstreams 808 for various purposes. For example, server system 812 may store bitstreams 808 for subsequent reconstruction of the point clouds. In this example, server system 812 may use the point clouds along with other data (e.g., vehicle telemetry data generated by vehicle 800) to train an autonomous driving system. In other example, server system 812 may store bitstreams 808 for subsequent reconstruction for forensic crash investigations (e.g., if vehicle 800 collides with pedestrians 806).

Figure 9:
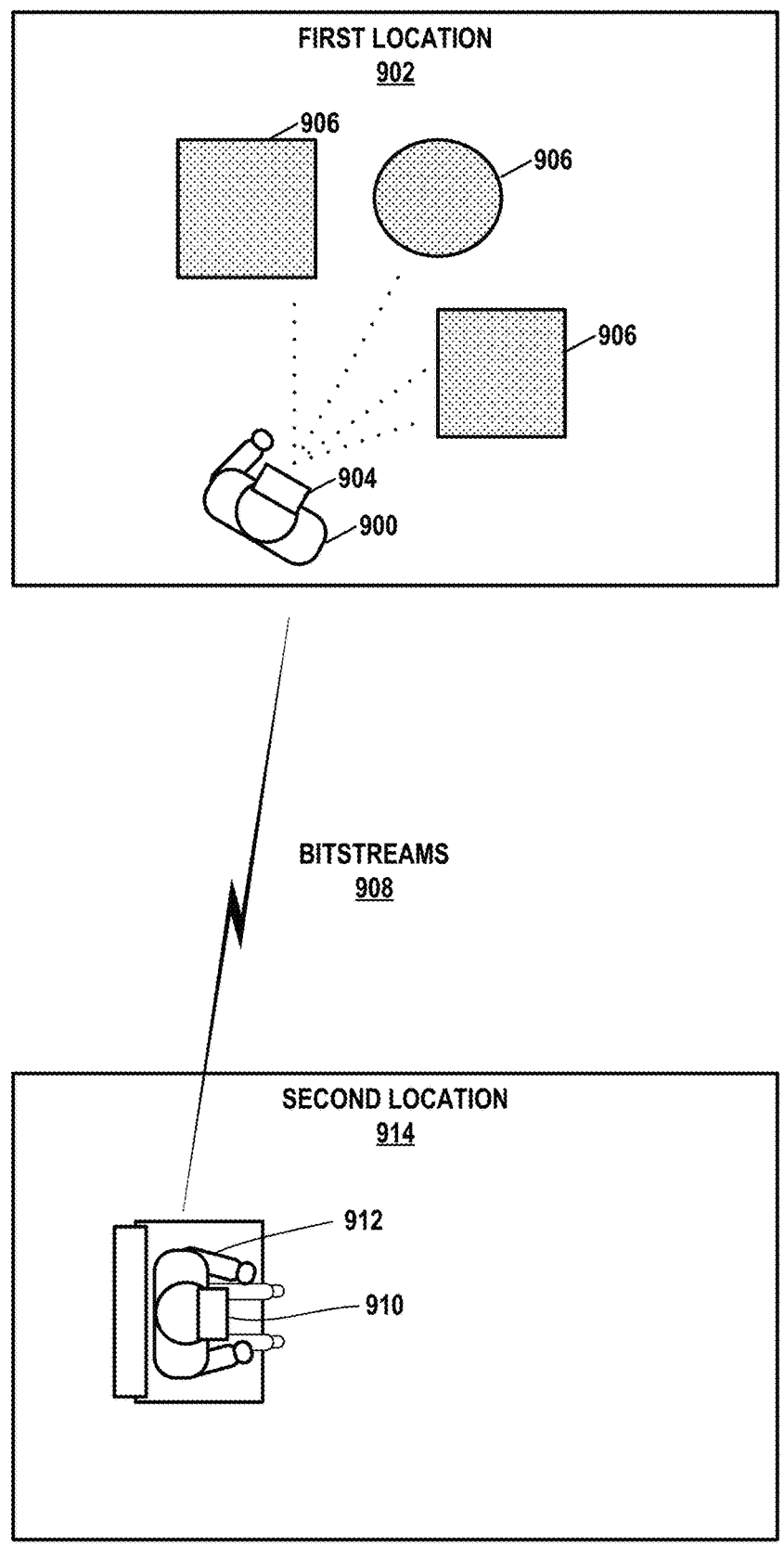
FIG. 9 is a conceptual diagram illustrating an example extended reality system in which one or more techniques of this disclosure may be used.

FIG. 9 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 9, a user 900 is located in a first location 902. User 900 wears an XR headset 904. As an alternative to XR headset 904, user 900 may use a mobile device (e.g., mobile phone, tablet computer, etc.). XR headset 904 includes a depth detection sensor, such as a range-finding system, that detects positions of points on objects 906 at location 902. A data source of XR headset 904 may use the signals generated by the depth detection sensor to generate a point cloud representation of objects 906 at location 902. XR headset 904 may include a G-PCC encoder (e.g., G-PCC encoder 200 of FIG. 1) that is configured to encode the point cloud to generate bitstreams 908.

XR headset 904 may transmit bitstreams 908 (e.g., via a network such as the Internet) to an XR headset 910 worn by a user 912 at a second location 914. XR headset 910 may decode bitstreams 908 to reconstruct the point cloud. XR headset 910 may use the point cloud to generate an XR visualization (e.g., an AR, MR, VR visualization) representing objects 906 at location 902. Thus, in some examples, such as when XR headset 910 generates an VR visualization, user 912 may have a 3D immersive experience of location 902. In some examples, XR headset 910 may determine a position of a virtual object based on the reconstructed point cloud. For instance, XR headset 910 may determine, based on the reconstructed point cloud, that an environment (e.g., location 902) includes a flat surface and then determine that a virtual object (e.g., a cartoon character) is to be positioned on the flat surface. XR headset 910 may generate an XR visualization in which the virtual object is at the determined position. For instance, XR headset 910 may show the cartoon character sitting on the flat surface.

Figure 10:
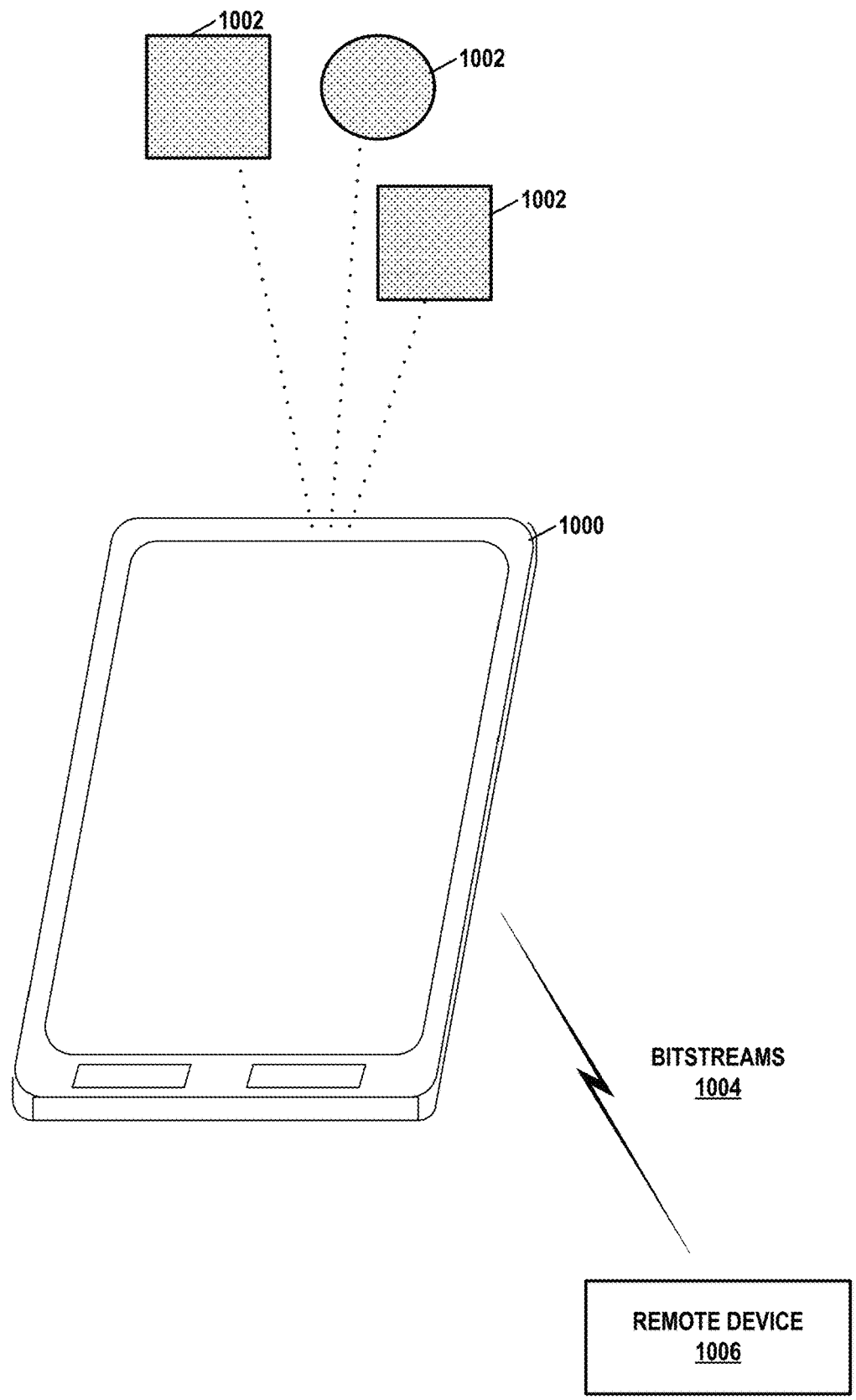
FIG. 10 is a conceptual diagram illustrating an example mobile device system in which one or more techniques of this disclosure may be used.

FIG. 10 is a conceptual diagram illustrating an example mobile device system in which one or more techniques of this disclosure may be used. In the example of FIG. 10, a mobile device 1000, such as a mobile phone or tablet computer, includes a range-finding system, such as a LIDAR system, that detects positions of points on objects 1002 in an environment of mobile device 1000. A data source of mobile device 1000 may use the signals generated by the depth detection sensor to generate a point cloud representation of objects 1002. Mobile device 1000 may include a G-PCC encoder (e.g., G-PCC encoder 200 of FIG. 1) that is configured to encode the point cloud to generate bitstreams 1004. In the example of FIG. 10, mobile device 1000 may transmit bitstreams to a remote device 1006, such as a server system or other mobile device. Remote device 1006 may decode bitstreams 1004 to reconstruct the point cloud. Remote device 1006 may use the point cloud for various purposes. For example, remote device 1006 may use the point cloud to generate a map of environment of mobile device 1000. For instance, remote device 1006 may generate a map of an interior of a building based on the reconstructed point cloud. In another example, remote device 1006 may generate imagery (e.g., computer graphics) based on the point cloud. For instance, remote device 1006 may use points of the point cloud as vertices of polygons and use color attributes of the points as the basis for shading the polygons. In some examples, remote device 1006 may use the reconstructed point cloud for facial recognition or other security applications.

Examples in the various aspects of this disclosure may be used individually or in any combination. The following are some example clauses that may be utilized separately or in combination.

Clause 1. A method of coding a point cloud, the method comprising determining that residual values for one or more color components of a point, in the point cloud, are equal to 0, and coding the residual values, in a non-independent manner, based on the determination that the residual values for one or more of the color components of the point are equal to 0.

Clause 2. The method of clause 1, wherein coding the residual values, in the non-independent manner, comprises coding a residual value for one of the color components in a first manner based on residual values for two other color components being equal 0, wherein the first manner is different than a second manner in which to code a residual value for the one of the color components based on residual values for the two other components not being equal to 0.

Clause 3. The method of any of clauses 1 and 2, wherein determining that the residual values for the one or more color components of the point are equal to 0 comprises determining that the residual values for two color components of the point are equal to 0, and wherein coding the residual values, in the non-independent manner, based on the determination that the residual values for one or more of the color components of the point are equal to 0 comprises coding a residual value for a third color component based on an offset.

Clause 4. The method of clause 3, wherein coding the residual value for the third color component based on the offset comprises coding the residual value for the third color component by subtracting the offset from the residual value for the third color component for encoding or adding the offset to the residual value for the third color component for decoding.

Clause 5. The method of any of clauses 1-4, wherein determining that the residual values for the one or more color components of the point are equal to 0 comprises determining that the residual values for chroma color components of the point are equal to 0, and wherein coding the residual values, in the non-independent manner, based on the determination that the residual values for one or more of the color components of the point are equal to 0 comprises coding a residual value for a luma color component of the point based on an offset.

Clause 6. The method of any of clauses 1-5, further comprising generating the point cloud.

Clause 7. The method of any of clauses 1-6, wherein coding the residual values comprises coding chroma color components before coding a luma color component of the residual values.

Clause 8. The method of any of clauses 1-7, wherein coding comprises decoding the residual values, the method further comprising reconstructing the one or more color components for the point based on the residual values.

Clause 9. The method of any of clauses 1-7, wherein coding comprises encoding the residual values, the method further comprising signaling information indicative of the encoded residual values.

Clause 10. A device for coding a point cloud, the device comprising memory configured to store data representing the point cloud, and processing circuitry coupled to the memory and configured to perform the method of any of clauses 1-9.

Clause 11. The device of clause 10, wherein the device comprises a decoder.

Clause 12. The device of clause 10, wherein the device comprises an encoder.

Clause 13. The device of any of clauses 10-12, further comprising a device to generate the point cloud.

Clause 14. The device of any of clauses 10-13, further comprising a display to present imagery based on the point cloud.

Clause 15. A computer-readable storage medium having stored thereon instructions that, when executed, cause one or more processors to perform the method of any of clauses 1-9.

Clause 16. A device for coding a point cloud, the device comprising means for performing the method of any of clauses 1-9.

Clause 17. A method of coding a point cloud, the method comprising determining that residual values for one or more components for an attribute of a point, in the point cloud, are equal to 0, and coding the residual values, in a non-independent manner, based on the determination that the residual values for one or more of the components for the attribute of the point are equal to 0.

Clause 18. The method of clause 17, wherein coding the residual values, in the non-independent manner, comprises coding a residual value for one of the components in a first manner based on residual values for two other components being equal 0, wherein the first manner is different than a second manner in which to code a residual value for the one of the components based on residual values for the two other components not being equal to 0.

Clause 19. The method of any of clauses 17 and 18, wherein determining that the residual values for the one or more components of the point are equal to 0 comprises determining that the residual values for two components of the point are equal to 0, and wherein coding the residual values, in the non-independent manner, based on the determination that the residual values for one or more of the components of the point are equal to 0 comprises coding a residual value for a third component based on an offset.

Clause 20. The method of clause 19, wherein coding the residual value for the third component based on the offset comprises coding the residual value for the third component by subtracting the offset from the residual value for the third component for encoding or adding the offset to the residual value for the third component for decoding.

Clause 21. The method of any of clauses 17-20, wherein determining that the residual values for the one or more components of the point are equal to 0 comprises determining that the residual values for chroma components of the point are equal to 0, and wherein coding the residual values, in the non-independent manner, based on the determination that the residual values for one or more of the components of the point are equal to 0 comprises coding a residual value for a luma component of the point based on an offset.

Clause 22. The method of any of clauses 17-21, further comprising generating the point cloud.

Clause 23. The method of any of clauses 17-22, wherein coding the residual values comprises coding chroma components before coding a luma component of the residual values.

Clause 24. The method of any of clauses 17-23, wherein coding comprises decoding the residual values, the method further comprising reconstructing the one or more components for the point based on the residual values.

Clause 25. The method of any of clauses 17-23, wherein coding comprises encoding the residual values, the method further comprising signaling information indicative of the encoded residual values.

Clause 26. A device for coding a point cloud, the device comprising memory configured to store data representing the point cloud, and processing circuitry coupled to the memory and configured to perform the method of any of clauses 17-25.

Clause 27. The device of clause 26, wherein the device comprises a decoder.

Clause 28. The device of clause 26, wherein the device comprises an encoder.

Clause 29. The device of any of clauses 26-28, further comprising a device to generate the point cloud.

Clause 30. The device of any of clauses 26-28, further comprising a display to present imagery based on the point cloud.

Clause 31. A computer-readable storage medium having stored thereon instructions that, when executed, cause one or more processors to perform the method of any of clauses 17-25.

Clause 32. A device for coding a point cloud, the device comprising means for performing the method of any of clauses 17-25.

Clause 33. A method of coding a point cloud, the method comprising determining that residual values for one or more components for an attribute of a point, in the point cloud, are equal to 0, and coding the residual values, in a non-independent manner, based on the determination that the residual values for one or more of the components for the attribute of the point are equal to 0.

Clause 34. The method of clause 33, wherein coding the residual values, in the non-independent manner, comprises coding a residual value for one of the components in a first manner based on residual values for two other components being equal 0, wherein the first manner is different than a second manner in which to code a residual value for the one of the components based on residual values for the two other components not being equal to 0.

Clause 35. The method of clause 33, wherein determining that the residual values for the one or more components of the point are equal to 0 comprises determining that the residual values for two components of the point are equal to 0, and wherein coding the residual values, in the non-independent manner, based on the determination that the residual values for one or more of the components of the point are equal to 0 comprises coding a residual value for a third component based on an offset.

Clause 36. The method of clause 35, wherein coding the residual value for the third component based on the offset comprises coding the residual value for the third component by subtracting the offset from the residual value for the third component for encoding or adding the offset to the residual value for the third component for decoding.

Clause 37. The method of clause 33, wherein determining that the residual values for the one or more components of the point are equal to 0 comprises determining that the residual values for chroma components of the point are equal to 0, and wherein coding the residual values, in the non-independent manner, based on the determination that the residual values for one or more of the components of the point are equal to 0 comprises coding a residual value for a luma component of the point based on an offset.

Clause 38. The method of clause 33, further comprising generating the point cloud.

Clause 39. The method of clause 33, wherein coding the residual values comprises coding chroma components before coding a luma component of the residual values.

Clause 40. The method of clause 33, wherein coding comprises decoding the residual values, the method further comprising reconstructing the one or more components for the point based on the residual values.

Clause 41. The method of clause 33, wherein coding comprises encoding the residual values, the method further comprising signaling information indicative of the encoded residual values.

Clause 42. A device for coding a point cloud, the device comprising memory configured to store data representing the point cloud, and processing circuitry coupled to the memory and configured to perform the method of any of clauses 33-41.

Clause 43. The device of clause 42, wherein the device comprises a decoder.

Clause 44. The device of clause 42, wherein the device comprises an encoder.

Clause 45. The device of clause 42, further comprising a device to generate the point cloud.

Clause 46. The device of clause 42, further comprising a display to present imagery based on the point cloud.

Clause 1A: A method of encoding a point cloud includes determining that residual values for all components except one component of an attribute of a point in the point cloud are equal to zero; based on the determination that residual values for all components except the one component of the attribute are equal to zero, determining a value for the one component that is equal to a magnitude of a residual value of the one component of the attribute minus an offset; encoding the value of the one component; and signaling the encoded value in a bitstream.

Clause 2A: The method of clause 1A, further includes encoding the value of zero for the components except the one component of the attribute; and signaling the encoded value of zero for the components except the one component of the attribute.

Clause 3A: The method of clause 2A, wherein encoding the value of zero for the components except the one component of the attribute comprises encoding the value of zero for the components except the one component of the attribute before encoding the value of the one component.

Clause 4A: The method of clause 3A, wherein, in a processing order, the one component is processed before the components except the one component, and wherein encoding the value of zero for the components except the one component of the attribute before encoding the value of the one component comprises encoding, in an encoding order different than the processing order, the value of zero for the components except the one component, wherein, in the encoding order, the one component is encoded after the components except the one component.

Clause 5A: The method of any of clauses 3A and 4A, wherein the attribute is a color attribute, wherein the one component of the attribute is a luma component, and wherein the components except the one component include chroma components.

Clause 6A: The method of any of clauses 1A through 5A, wherein the point comprises a first point, the method further includes determining that residual values for at least two components of components of an attribute of a second point in the point cloud are not equal to zero; and encoding the residual values for the components of the attribute of the second point.

Clause 7A: The method of any of clauses 1A through 6A, wherein the attribute comprises at least one of a color, frame number, humidity, temperature, surface normal, a combination of humidity and temperature, or a combination of color and surface normal.

Clause 8A: The method of any of clauses 1A through 7A, wherein the offset is equal to 1.

Clause 9A: A method of decoding a point cloud includes decoding values for components of an attribute of a point in the point cloud, the values indicative of residual values for the components; determining that residual values for all components except one component of the attribute are equal to zero; based on the determination that the residual values for all components except the one component of the attribute are equal to zero, adding an offset to a decoded value for the one component of the attribute to determine a magnitude of a residual value for the one component; and reconstructing the components of the attribute of the point based on the residual values for the components.

Clause 10A: The method of clause 9A, further includes decoding the value of zero for the components except the one component of the attribute.

Clause 11A: The method of clause 10A, wherein decoding the value of zero for the components except the one component of the attribute comprises decoding the value of zero for the components except the one component of the attribute before decoding the value of the one component.

Clause 12A: The method of clause 11A, wherein, in a processing order, the one component is processed before the components except the one component, and wherein decoding the value of zero for the components except the one component of the attribute before decoding the value of the one component comprises decoding, in a decoding order different than the processing order, the value of zero for the components except the one component, wherein, in the decoding order, the one component is decoded after the components except the one component.

Clause 13A: The method of any of clauses 11A and 12A, wherein the attribute is a color attribute, wherein the one component of the attribute is a luma component, and wherein the components except the one component include chroma components.

Clause 14A: The method of any of clauses 9A through 13A, wherein the point comprises a first point, the method further includes determining that residual values for at least two components of components of an attribute of a second point in the point cloud are not equal to zero; and decoding the residual values for the components of the attribute of the second point.

Clause 15A: The method of any of clauses 9A through 14A, wherein the attribute comprises at least one of a color, frame number, humidity, temperature, surface normal, a combination of humidity and temperature, or a combination of color and surface normal.

Clause 16A: The method of any of clauses 9A through 15A, wherein the offset is equal to 1.

Clause 17A: A device for encoding a point cloud includes memory configured to store the point cloud; and processing circuitry configured to: determine that residual values for all components except one component of an attribute of a point in the point cloud are equal to zero; based on the determination that the residual values for all components except the one component of the attribute are equal to zero, determine a value for the one component that is equal to a magnitude of a residual value of the one component of the attribute minus an offset; encode the value of the one component; and signal the encoded value in a bitstream.

Clause 18A: The device of clause 17A, wherein the processing circuitry is configured to: encode the value of zero for the components except the one component of the attribute; and signal the encoded value of zero for the components except the one component of the attribute.

Clause 19A: The device of clause 18A, wherein to encode the value of zero for the components except the one component of the attribute, the processing circuitry is configured to encode the value of zero for the components except the one component of the attribute before encoding the value of the one component.

Clause 20A: The device of clause 19A, wherein, in a processing order, the one component is processed before the components except the one component, and wherein to encode the value of zero for the components except the one component of the attribute before encoding the value of the one component, the processing circuitry is configured to encode, in an encoding order different than the processing order, the value of zero for the components except the one component, wherein, in the encoding order, the one component is encoded after the components except the one component.

Clause 21A: The device of any of clauses 19A and 20A, wherein the attribute is a color attribute, wherein the one component of the attribute is a luma component, and wherein the components except the one component include chroma components.

Clause 22A: The device of any of clauses 17A through 21A, wherein the point comprises a first point, and wherein the processing circuitry is configured to: determine that residual values for at least two components of components of an attribute of a second point in the point cloud are not equal to zero; and encode the residual values for the components of the attribute of the second point.

Clause 23A: The device of any of clauses 17A through 22A, wherein the attribute comprises at least one of color, frame number, humidity, temperature, surface normal, a combination of humidity and temperature, or a combination of color and surface normal.

Clause 24A: The device of any of clauses 17A through 23A, wherein the offset is equal to 1.

Clause 25A: The device of any of clauses 17A through 24A, wherein the processing circuitry is configured to generate the point cloud.

Clause 26A: The device of clause 25A, wherein the processing circuitry is configured to, as part of generating the point cloud, generate the point cloud based on signals from a LIDAR apparatus.

Clause 27A: The device of any of clauses 17A through 26A, wherein the device is one of a mobile phone or tablet computer.

Clause 28A: The device of any of clauses 17A through 27A, wherein the device is a vehicle.

Clause 29A: The device of any of clauses 17A through 28A, wherein the device is an extended reality device.

Clause 30A: The device of any of clauses 17A through 29A, wherein the device comprises an interface configured to transmit the point cloud data.

Clause 31A: A device for decoding a point cloud includes memory configured to store the point cloud; and processing circuitry configured to: decode values for components of an attribute of a point in the point cloud, the values indicative of residual values for the components; determine that residual values for all components except one component of the attribute are equal to zero; based on the determination that the residual values for all components except the one component of the attribute are equal to zero, add an offset to a decoded value for the one component of the attribute to determine a magnitude of a residual value for the one component; and reconstruct the components of the attribute of the point based on the residual values for the components.

Clause 32A: The device of clause 31A, wherein the processing circuitry is configured to: decode the value of zero for the components except the one component of the attribute.

Clause 33A: The device of clause 32A, wherein to decode the value of zero for the components except the one component of the attribute, the processing circuitry is configured to decode the value of zero for the components except the one component of the attribute before decoding the value of the one component.

Clause 34A: The device of clause 33A, wherein, in a processing order, the one component is processed before the components except the one component, and wherein to decode the value of zero for the components except the one component of the attribute before decoding the value of the one component, the processing circuitry is configured to decode, in a decoding order different than the processing order, the value of zero for the components except the one component, wherein, in the decoding order, the one component is decoded after the components except the one component.

Clause 35A: The device of any of clauses 33A and 34A, wherein the attribute is a color attribute, wherein the one component of the attribute is a luma component, and wherein the components except the one component include chroma components.

Clause 36A: The device of any of clauses 31A through 35A, wherein the point comprises a first point, and wherein the processing circuitry is configured to: determine that residual values for at least two components of components of an attribute of a second point in the point cloud are not equal to zero; and decode the residual values for the components of the attribute of the second point.

Clause 37A: The device of any of clauses 31A through 36A, wherein the attribute comprises at least one of color, frame number, humidity, temperature, surface normal, a combination of humidity and temperature, or a combination of color and surface normal.

Clause 38A: The device of any of clauses 31A through 37A, wherein the offset is equal to 1.

Clause 39A: The device of any of clauses 31A through 38A, wherein the processing circuitry is configured to generate a map of an interior of a building based on the reconstructed components.

Clause 40A: The device of any of clauses 31A through 39A, wherein the processing circuitry is configured to perform an autonomous navigation operation based on the reconstructed components.

Clause 41A: The device of any of clauses 31A through 40A, wherein the processing circuitry is configured to generate computer graphics based on the reconstructed components.

Clause 42A: The device of clause 41A, wherein the processing circuitry is configured to: determine a position of a virtual object based on the reconstructed components; and generate an extended reality (XR) visualization in which the virtual object is at the determined position.

Clause 43A: The device of any of clauses 31A through 42A, wherein the device is one of a mobile phone or tablet computer.

Clause 44A: The device of any of clauses 31A through 43A, wherein the device is a vehicle.

Clause 45A: The device of any of clauses 31A through 44A, wherein the device is an extended reality device.

Clause 46A: The device of any of clauses 31A through 45A, further comprising a display to present imagery based on the point cloud.

Clause 47A: A computer-readable storage medium storing instructions thereon that when executed cause one or more processors of a device for encoding a point cloud to: determine that residual values for all components except one component of an attribute of a point in the point cloud are equal to zero; based on the determination that the residual values for all components except the one component of the attribute are equal to zero, determine a value for the one component that is equal to a magnitude of a residual value of the one component of the attribute minus an offset; encode the value of the one component; and signal the encoded value in a bitstream.

Clause 48A: A computer-readable storage medium storing instructions thereon that when executed cause one or more processors of a device for decoding a point cloud to: decode values for components of an attribute of a point in the point cloud, the values indicative of residual values for the components; determine that residual values for all components except one component of the attribute are equal to zero; based on the determination that the residual values for all components except the one component of the attribute are equal to zero, add an offset to a decoded value for the one component of the attribute to determine a magnitude of a residual value for the one component; and reconstruct the components of the attribute of the point based on the residual values for the components.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Clause 1B: A method of encoding a point cloud includes determining that residual values for all components except one component of an attribute of a point in the point cloud are equal to zero; based on the determination that the residual values for all components except the one component of the attribute are equal to zero, determining a value for the one component that is equal to a magnitude of a residual value of the one component of the attribute minus an offset; encoding the value of the one component; and signaling the encoded value in a bitstream.

Clause 2B: The method of clause 1B, further includes encoding the value of zero for the components except the one component of the attribute; and signaling the encoded value of zero for the components except the one component of the attribute.

Clause 3B: The method of clause 2B, wherein encoding the value of zero for the components except the one component of the attribute comprises encoding the value of zero for the components except the one component of the attribute before encoding the value of the one component.

Clause 4B: The method of clause 3B, wherein, in a processing order, the one component is processed before the components except the one component, and wherein encoding the value of zero for the components except the one component of the attribute before encoding the value of the one component comprises encoding, in an encoding order different than the processing order, the value of zero for the components except the one component, wherein, in the encoding order, the one component is encoded after the components except the one component.

Clause 5B: The method of clause 3B, wherein the attribute is a color attribute, wherein the one component of the attribute is a luma component, and wherein the components except the one component include chroma components.

Clause 6B: The method of clause 1B, wherein the point comprises a first point, the method further includes determining that residual values for at least two components of components of an attribute of a second point in the point cloud are not equal to zero; and encoding the residual values for the components of the attribute of the second point.

Clause 7B: The method of clause 1B, wherein the attribute comprises at least one of a color, frame number, humidity, temperature, surface normal, a combination of humidity and temperature, or a combination of color and surface normal.

Clause 8B: The method of clause 1B, wherein the offset is equal to 1.

Clause 9B: A method of decoding a point cloud includes decoding values for components of an attribute of a point in the point cloud, the values indicative of residual values for the components; determining that residual values for all components except one component of the attribute are equal to zero; based on the determination that the residual values for all components except the one component of the attribute are equal to zero, adding an offset to a decoded value for the one component of the attribute to determine a magnitude of a residual value for the one component; and reconstructing the components of the attribute of the point based on the residual values for the components.

Clause 10B: The method of clause 9B, further includes decoding the value of zero for the components except the one component of the attribute.

Clause 11B: The method of clause 10B, wherein decoding the value of zero for the components except the one component of the attribute comprises decoding the value of zero for the components except the one component of the attribute before decoding the value of the one component.

Clause 12B: The method of clause 11B, wherein, in a processing order, the one component is processed before the components except the one component, and wherein decoding the value of zero for the components except the one component of the attribute before decoding the value of the one component comprises decoding, in a decoding order different than the processing order, the value of zero for the components except the one component, wherein, in the decoding order, the one component is decoded after the components except the one component.

Clause 13B: The method of clause 11B, wherein the attribute is a color attribute, wherein the one component of the attribute is a luma component, and wherein the components except the one component include chroma components.

Clause 14B: The method of clause 9B, wherein the point comprises a first point, the method further includes determining that residual values for at least two components of components of an attribute of a second point in the point cloud are not equal to zero; and decoding the residual values for the components of the attribute of the second point.

Clause 15B: The method of clause 9B, wherein the attribute comprises at least one of a color, frame number, humidity, temperature, surface normal, a combination of humidity and temperature, or a combination of color and surface normal.

Clause 16B: The method of clause 9B, wherein the offset is equal to 1.

Clause 17B: A device for encoding a point cloud includes memory configured to store the point cloud; and processing circuitry configured to: determine that residual values for all components except one component of an attribute of a point in the point cloud are equal to zero; based on the determination that the residual values for all components except the one component of the attribute are equal to zero, determine a value for the one component that is equal to a magnitude of a residual value of the one component of the attribute minus an offset; encode the value of the one component; and signal the encoded value in a bitstream.

Clause 18B: The device of clause 17B, wherein the processing circuitry is configured to: encode the value of zero for the components except the one component of the attribute; and signal the encoded value of zero for the components except the one component of the attribute.

Clause 19B: The device of clause 18B, wherein to encode the value of zero for the components except the one component of the attribute, the processing circuitry is configured to encode the value of zero for the components except the one component of the attribute before encoding the value of the one component.

Clause 20B: The device of clause 19B, wherein, in a processing order, the one component is processed before the components except the one component, and wherein to encode the value of zero for the components except the one component of the attribute before encoding the value of the one component, the processing circuitry is configured to encode, in an encoding order different than the processing order, the value of zero for the components except the one component, wherein, in the encoding order, the one component is encoded after the components except the one component.

Clause 21B: The device of clause 19B, wherein the attribute is a color attribute, wherein the one component of the attribute is a luma component, and wherein the components except the one component include chroma components.

Clause 22B: The device of clause 17B, wherein the point comprises a first point, and wherein the processing circuitry is configured to: determine that residual values for at least two components of components of an attribute of a second point in the point cloud are not equal to zero; and encode the residual values for the components of the attribute of the second point.

Clause 23B: The device of clause 17B, wherein the attribute comprises at least one of color, frame number, humidity, temperature, surface normal, a combination of humidity and temperature, or a combination of color and surface normal.

Clause 24B: The device of clause 17B, wherein the offset is equal to 1.

Clause 25B: The device of clause 17B, wherein the processing circuitry is configured to generate the point cloud.

Clause 26B: The device of clause 25B, wherein the processing circuitry is configured to, as part of generating the point cloud, generate the point cloud based on signals from a LIDAR apparatus.

Clause 27B: The device of clause 17B, wherein the device is one of a mobile phone or tablet computer.

Clause 28B: The device of clause 17B, wherein the device is a vehicle.

Clause 29B: The device of clause 17B, wherein the device is an extended reality device.

Clause 30B: The device of clause 17B, wherein the device comprises an interface configured to transmit the point cloud data.

Clause 31B: A device for decoding a point cloud includes memory configured to store the point cloud; and processing circuitry configured to: decode values for components of an attribute of a point in the point cloud, the values indicative of residual values for the components; determine that residual values for all components except one component of the attribute are equal to zero; based on the determination that the residual values for all components except the one component of the attribute are equal to zero, add an offset to a decoded value for the one component of the attribute to determine a magnitude of a residual value for the one component; and reconstruct the components of the attribute of the point based on the residual values for the components.

Clause 32B: The device of clause 31B, wherein the processing circuitry is configured to: decode the value of zero for the components except the one component of the attribute.

Clause 33B: The device of clause 32B, wherein to decode the value of zero for the components except the one component of the attribute, the processing circuitry is configured to decode the value of zero for the components except the one component of the attribute before decoding the value of the one component.

Clause 34B: The device of clause 33B, wherein, in a processing order, the one component is processed before the components except the one component, and wherein to decode the value of zero for the components except the one component of the attribute before decoding the value of the one component, the processing circuitry is configured to decode, in a decoding order different than the processing order, the value of zero for the components except the one component, wherein, in the decoding order, the one component is decoded after the components except the one component.

Clause 35B: The device of clause 33B, wherein the attribute is a color attribute, wherein the one component of the attribute is a luma component, and wherein the components except the one component include chroma components.

Clause 36B: The device of clause 31B, wherein the point comprises a first point, and wherein the processing circuitry is configured to: determine that residual values for at least two components of components of an attribute of a second point in the point cloud are not equal to zero; and decode the residual values for the components of the attribute of the second point.

Clause 37B: The device of clause 31B, wherein the attribute comprises at least one of color, frame number, humidity, temperature, surface normal, a combination of humidity and temperature, or a combination of color and surface normal.

Clause 38B: The device of clause 31B, wherein the offset is equal to 1.

Clause 39B: The device of clause 31B, wherein the processing circuitry is configured to generate a map of an interior of a building based on the reconstructed components.

Clause 40B: The device of clause 31B, wherein the processing circuitry is configured to perform an autonomous navigation operation based on the reconstructed components.

Clause 41B: The device of clause 31B, wherein the processing circuitry is configured to generate computer graphics based on the reconstructed components.

Clause 42B: The device of clause 41B, wherein the processing circuitry is configured to: determine a position of a virtual object based on the reconstructed components; and generate an extended reality (XR) visualization in which the virtual object is at the determined position.

Clause 43B: The device of clause 31B, wherein the device is one of a mobile phone or tablet computer.

Clause 44B: The device of clause 31B, wherein the device is a vehicle.

Clause 45B: The device of clause 31B, wherein the device is an extended reality device.

Clause 46B: The device of clause 31B, further comprising a display to present imagery based on the point cloud.

Clause 47B: A computer-readable storage medium storing instructions thereon that when executed cause one or more processors of a device for encoding a point cloud to: determine that residual values for all components except one component of an attribute of a point in the point cloud are equal to zero; based on the determination that the residual values for all components except the one component of the attribute are equal to zero, determine a value for the one component that is equal to a magnitude of a residual value of the one component of the attribute minus an offset; encode the value of the one component; and signal the encoded value in a bitstream.

Clause 48B: A computer-readable storage medium storing instructions thereon that when executed cause one or more processors of a device for decoding a point cloud to: decode values for components of an attribute of a point in the point cloud, the values indicative of residual values for the components; determine that residual values for all components except one component of the attribute are equal to zero; based on the determination that the residual values for all components except the one component of the attribute are equal to zero, add an offset to a decoded value for the one component of the attribute to determine a magnitude of a residual value for the one component; and reconstruct the components of the attribute of the point based on the residual values for the components.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding a point cloud, the method comprising:
   determining respective residual values for each component of a plurality of components of one attribute of one point in the point cloud, wherein each respective residual value is based on a difference between a respective value of each component and a respective predictor for each component;
   in a condition where the residual values for all components of the plurality of components of the one attribute of the one point in the point cloud except one component of the plurality of components of the one attribute are equal to zero, determining a value for the one component that is equal to a magnitude of a residual value of the one component of the one attribute minus an offset;
   encoding the value of the one component; and
   signaling the encoded value in a bitstream.

2. The method of claim 1, further comprising:
   encoding the value of zero for the components except the one component of the one attribute; and
   signaling the encoded value of zero for the components except the one component of the one attribute.

3. The method of claim 2, wherein encoding the value of zero for the components except the one component of the one attribute comprises encoding the value of zero for the components except the one component of the one attribute before encoding the value of the one component.

4. The method of claim 3,
   wherein, in a processing order, the one component is processed before the components except the one component, and
   wherein encoding the value of zero for the components except the one component of the one attribute before encoding the value of the one component comprises encoding, in an encoding order different than the processing order, the value of zero for the components except the one component, wherein, in the encoding order, the one component is encoded after the components except the one component.

5. The method of claim 3, wherein the one attribute is a color attribute, wherein the one component of the one attribute is a luma component, and wherein the components except the one component include chroma components.

6. The method of claim 1, wherein the one point comprises a first point, the method further comprising:
   in a condition where residual values for at least two components of one attribute of a second point in the point cloud are not equal to zero, encoding the residual values for the components of the one attribute of the second point.

7. The method of claim 1, wherein the one attribute comprises at least one of a color, frame number, humidity, temperature, surface normal, a combination of humidity and temperature, or a combination of color and surface normal.

8. The method of claim 1, wherein the offset is equal to 1.

9. A method of decoding a point cloud, the method comprising:
   decoding values for a plurality of components of one attribute of one point in the point cloud, the values indicative of residual values for the plurality of components;
   in a condition where residual values for all components of the plurality of components of the one attribute except one component of the plurality of components of the one attribute are equal to zero, adding an offset to a decoded value for the one component of the one attribute to determine a magnitude of a residual value for the one component; and
   reconstructing the components of the one attribute of the one point based on the residual values for the components, wherein reconstructing the components comprises adding a respective residual value, of the residual values, for a respective component of the plurality of components to a respective predictor for the respective component.

10. The method of claim 9, further comprising:
    decoding the value of zero for the components except the one component of the one attribute.

11. The method of claim 10, wherein decoding the value of zero for the components except the one component of the one attribute comprises decoding the value of zero for the components except the one component of the one attribute before decoding the value of the one component.

12. The method of claim 11,
    wherein, in a processing order, the one component is processed before the components except the one component, and
    wherein decoding the value of zero for the components except the one component of the one attribute before decoding the value of the one component comprises decoding, in a decoding order different than the processing order, the value of zero for the components except the one component, wherein, in the decoding order, the one component is decoded after the components except the one component.

13. The method of claim 11, wherein the one attribute is a color attribute, wherein the one component of the one attribute is a luma component, and wherein the components except the one component include chroma components.

14. The method of claim 9, wherein the one point comprises a first point, the method further comprising:
in a condition where residual values for at least two components of one attribute of a second point in the point cloud are not equal to zero, decoding the residual values for the components of the one attribute of the second point.

15. The method of claim 9, wherein the one attribute comprises at least one of a color, frame number, humidity, temperature, surface normal, a combination of humidity and temperature, or a combination of color and surface normal.

16. The method of claim 9, wherein the offset is equal to 1.

17. A device for encoding a point cloud, the device comprising:
one or more memories configured to store the point cloud; and
processing circuitry configured to:
determine respective residual values for each component of a plurality of components of one attribute of one point in the point cloud, wherein each respective residual value is based on a difference between a respective value of each component and a respective predictor for each component;
in a condition where the residual values for all components of the plurality of components of the one attribute of the one point in the point cloud except one component of the plurality of components of the one attribute are equal to zero, determine a value for the one component that is equal to a magnitude of a residual value of the one component of the one attribute minus an offset;
encode the value of the one component; and
signal the encoded value in a bitstream.

18. The device of claim 17, wherein the processing circuitry is configured to:
encode the value of zero for the components except the one component of the one attribute; and
signal the encoded value of zero for the components except the one component of the one attribute.

19. The device of claim 18, wherein to encode the value of zero for the components except the one component of the one attribute, the processing circuitry is configured to encode the value of zero for the components except the one component of the one attribute before encoding the value of the one component.

20. The device of claim 19,
wherein, in a processing order, the one component is processed before the components except the one component, and
wherein to encode the value of zero for the components except the one component of the one attribute before encoding the value of the one component, the processing circuitry is configured to encode, in an encoding order different than the processing order, the value of zero for the components except the one component, wherein, in the encoding order, the one component is encoded after the components except the one component.

21. The device of claim 19, wherein the one attribute is a color attribute, wherein the one component of the one attribute is a luma component, and wherein the components except the one component include chroma components.

22. The device of claim 17, wherein the one point comprises a first point, and wherein the processing circuitry is configured to:
in a condition where residual values for at least two components of one attribute of a second point in the point cloud are not equal to zero, encode the residual values for the components of the one attribute of the second point.

23. The device of claim 17, wherein the one attribute comprises at least one of color, frame number, humidity, temperature, surface normal, a combination of humidity and temperature, or a combination of color and surface normal.

24. The device of claim 17, wherein the offset is equal to 1.

25. The device of claim 17, wherein the processing circuitry is configured to generate the point cloud.

26. The device of claim 25, wherein the processing circuitry is configured to, as part of generating the point cloud, generate the point cloud based on signals from a LIDAR apparatus.

27. The device of claim 17, wherein the device is one of a mobile phone or tablet computer.

28. The device of claim 17, wherein the device is a vehicle.

29. The device of claim 17, wherein the device is an extended reality device.

30. The device of claim 17, wherein the device comprises an interface configured to transmit data of the point cloud.

31. A device for decoding a point cloud, the device comprising:
one or more memories configured to store the point cloud; and
processing circuitry configured to:
decode values for a plurality of components of one attribute of one point in the point cloud, the values indicative of residual values for the plurality of components;
in a condition where residual values for all components of the plurality of components except one component of the plurality of components of the one attribute are equal to zero, add an offset to a decoded value for the one component of the one attribute to determine a magnitude of a residual value for the one component; and
reconstruct the components of the one attribute of the one point based on the residual values for the components, wherein to reconstruct the components, the processing circuitry is configured to add a respective residual value, of the residual values, for a respective component of the plurality of components to a respective predictor for the respective component.

32. The device of claim 31, wherein the processing circuitry is configured to:
decode the value of zero for the components except the one component of the one attribute.

33. The device of claim 32, wherein to decode the value of zero for the components except the one component of the one attribute, the processing circuitry is configured to decode the value of zero for the components except the one component of the one attribute before decoding the value of the one component.

34. The device of claim 33,
wherein, in a processing order, the one component is processed before the components except the one component, and
wherein to decode the value of zero for the components except the one component of the one attribute before decoding the value of the one component, the processing circuitry is configured to decode, in a decoding order different than the processing order, the value of zero for the components except the one component, wherein, in the decoding order, the one component is decoded after the components except the one component.

35. The device of claim 33, wherein the one attribute is a color attribute, wherein the one component of the one attribute is a luma component, and wherein the components except the one component include chroma components.

36. The device of claim 31, wherein the one point comprises a first point, and wherein the processing circuitry is configured to:
in a condition where residual values for at least two components of one attribute of a second point in the point cloud are not equal to zero, decode the residual values for the components of the one attribute of the second point.

37. The device of claim 31, wherein the one attribute comprises at least one of color, frame number, humidity, temperature, surface normal, a combination of humidity and temperature, or a combination of color and surface normal.

38. The device of claim 31, wherein the offset is equal to 1.

39. The device of claim 31, wherein the processing circuitry is configured to generate a map of an interior of a building based on the reconstructed components.

40. The device of claim 31, wherein the processing circuitry is configured to perform an autonomous navigation operation based on the reconstructed components.

41. The device of claim 31, wherein the processing circuitry is configured to generate computer graphics based on the reconstructed components.

42. The device of claim 41, wherein the processing circuitry is configured to:
determine a position of a virtual object based on the reconstructed components; and
generate an extended reality (XR) visualization in which the virtual object is at the determined position.

43. The device of claim 31, wherein the device is one of a mobile phone or tablet computer.

44. The device of claim 31, wherein the device is a vehicle.

45. The device of claim 31, wherein the device is an extended reality device.

46. The device of claim 31, further comprising a display to present imagery based on the point cloud.

47. A computer-readable storage medium storing instructions thereon that when executed cause one or more processors of a device for encoding a point cloud to:
determine respective residual values for each component of a plurality of components of one attribute of one point in the point cloud, wherein each respective residual value is based on a difference between a respective value of each component and a respective predictor for each component;
in a condition where the residual values for all components of the plurality of components of the one attribute of the one point in the point cloud except one component of the plurality of components of the one attribute are equal to zero, determine a value for the one component that is equal to a magnitude of a residual value of the one component of the one attribute minus an offset;
encode the value of the one component; and
signal the encoded value in a bitstream.

48. A computer-readable storage medium storing instructions thereon that when executed cause one or more processors of a device for decoding a point cloud to:
decode values for a plurality of components of one attribute of one point in the point cloud, the values indicative of residual values for the plurality of components;
in a condition where residual values for all components of the plurality of components of the one attribute except one component of the plurality of components of the one attribute are equal to zero, add an offset to a decoded value for the one component of the one attribute to determine a magnitude of a residual value for the one component; and
reconstruct the components of the one attribute of the one point based on the residual values for the components, wherein the instructions that cause the one or more processors to reconstruct the components comprise instructions that cause the one or more processors to add a respective residual value, of the residual values, for a respective component of the plurality of components to a respective predictor for the respective component.

49. The device of claim 17, wherein the processing circuitry is configured to determine that the residual values for all components except the one component of the one attribute of the one point in the point cloud are equal to zero, and based on the determination that the residual values for all components of the plurality of components of the one attribute of the one point in the point cloud except the one component of the plurality of components of the one attribute are equal to zero, determine the value for the one component that is equal to the magnitude of the residual value of the one component of the one attribute minus the offset.

50. The device of claim 31, wherein the processing circuitry is configured to determine that the residual values for all components except the one component of the one attribute are equal to zero, and based on the determination that the residual values for all components of the plurality of components except the one component of the plurality of components of the one attribute are equal to zero, add the offset to the decoded value for the one component of the one attribute to determine the magnitude of the residual value for the one component.

* * * * *